(12) United States Patent
Ashida

(10) Patent No.: US 12,262,155 B2
(45) Date of Patent: Mar. 25, 2025

(54) PHOTOELECTRIC CONVERSION DEVICE, IMAGE PROCESSING METHOD, IMAGING SYSTEM, MOBILE BODY, AND EQUIPMENT

(71) Applicant: CANON KABUSHIKI KAISHA, Tokyo (JP)

(72) Inventor: Jumpei Ashida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 213 days.

(21) Appl. No.: 18/057,870

(22) Filed: Nov. 22, 2022

(65) Prior Publication Data

US 2023/0179751 A1 Jun. 8, 2023

(30) Foreign Application Priority Data

Dec. 7, 2021 (JP) ................. 2021-198679

(51) Int. Cl.
*H04N 23/60* (2023.01)
*H04N 9/64* (2023.01)
*H04N 23/67* (2023.01)
*H04N 25/42* (2023.01)
*H04N 25/75* (2023.01)
*H04N 25/77* (2023.01)
*H04N 23/84* (2023.01)

(52) U.S. Cl.
CPC ............ *H04N 9/646* (2013.01); *H04N 25/42* (2023.01); *H04N 25/75* (2023.01); *H04N 25/77* (2023.01); *H04N 23/84* (2023.01)

(58) Field of Classification Search
CPC ....... H04N 25/633; H04N 25/60; H04N 25/67
USPC ......................................................... 348/241
See application file for complete search history.

(56) References Cited

U.S. PATENT DOCUMENTS

| | | | |
|---|---|---|---|
| 2014/0204178 A1 | 7/2014 | Kawai | |
| 2014/0340554 A1* | 11/2014 | Ishii | H04N 25/46 348/302 |
| 2015/0109490 A1* | 4/2015 | Kanemitsu | H04N 25/62 348/246 |
| 2016/0044259 A1* | 2/2016 | Takado | H04N 25/616 348/297 |
| 2017/0230569 A1* | 8/2017 | Sambonsugi | H04N 25/63 |

(Continued)

FOREIGN PATENT DOCUMENTS

| | | |
|---|---|---|
| JP | 2009-5329 A | 1/2009 |
| JP | 2013-106186 A | 5/2013 |

(Continued)

OTHER PUBLICATIONS

U.S. Appl. No. 18/173,261, filed Feb. 23, 2023, by Hiromasa Tsuboi.

*Primary Examiner* — Anthony J Daniels
(74) *Attorney, Agent, or Firm* — VENABLE LLP

(57) ABSTRACT

A photoelectric conversion device according to an embodiment of the present disclosure includes a calculation unit configured to calculate an initial value of each of a plurality of first correction components based on a first pixel value read out from the first region, update each of the plurality of the first correction components based on a second pixel value read out from the second region and a predetermined second correction component, and calculate the correction value using the updated first correction component and the second correction component.

21 Claims, 18 Drawing Sheets

(56) References Cited

U.S. PATENT DOCUMENTS

| | | | | |
|---|---|---|---|---|
| 2019/0007634 A1* | 1/2019 | Shimizu | ............... | H04N 25/589 |
| 2019/0238770 A1* | 8/2019 | Sekiguchi | .............. | H04N 25/63 |
| 2022/0408036 A1 | 12/2022 | Ashida | | |
| 2024/0094397 A1* | 3/2024 | Talbert | ................ | H04N 25/633 |

FOREIGN PATENT DOCUMENTS

| | | | |
|---|---|---|---|
| JP | 2014-147080 | A | 8/2014 |
| JP | 2016-163207 | A | 9/2016 |
| JP | 2020-145555 | A | 9/2020 |

* cited by examiner

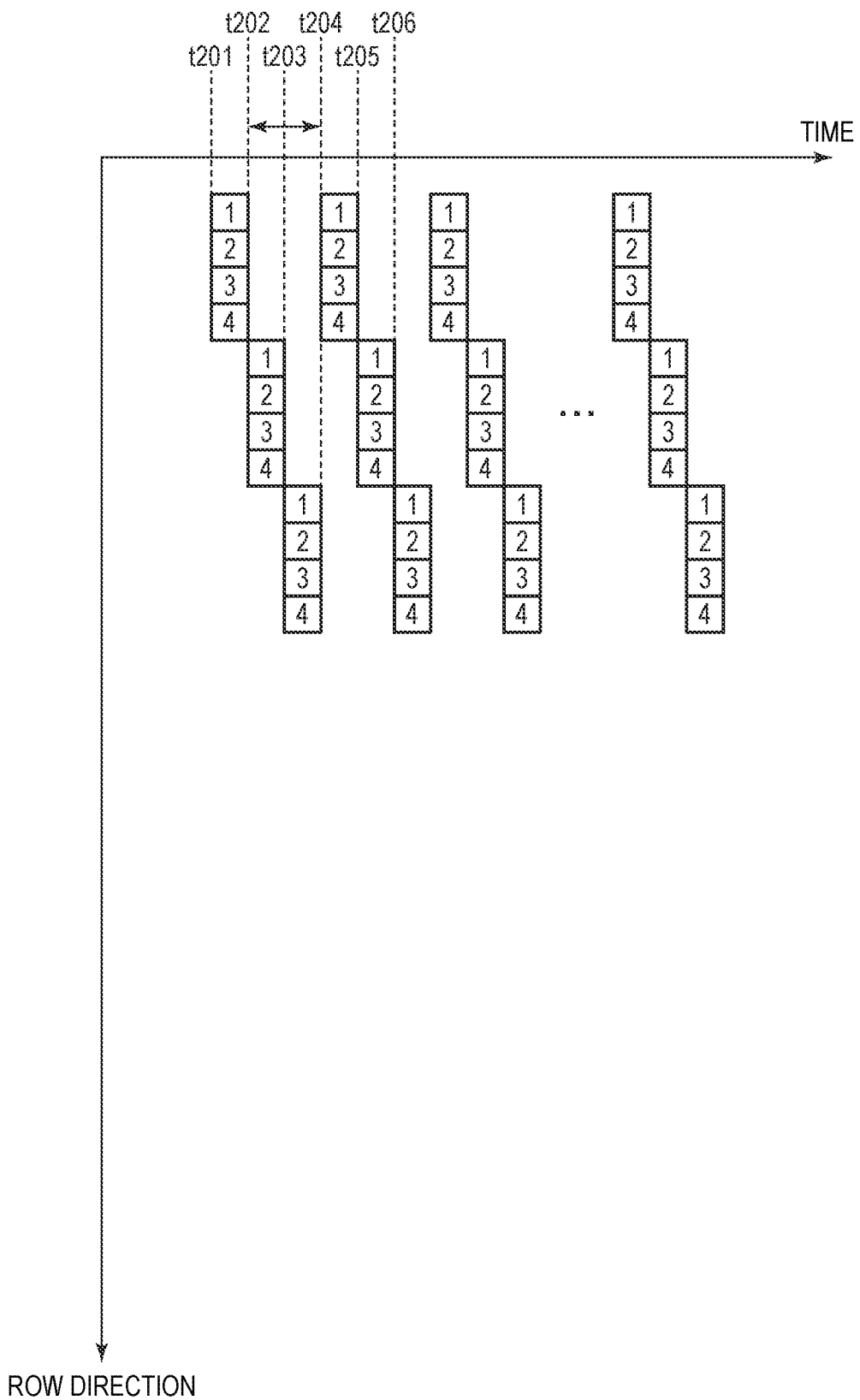

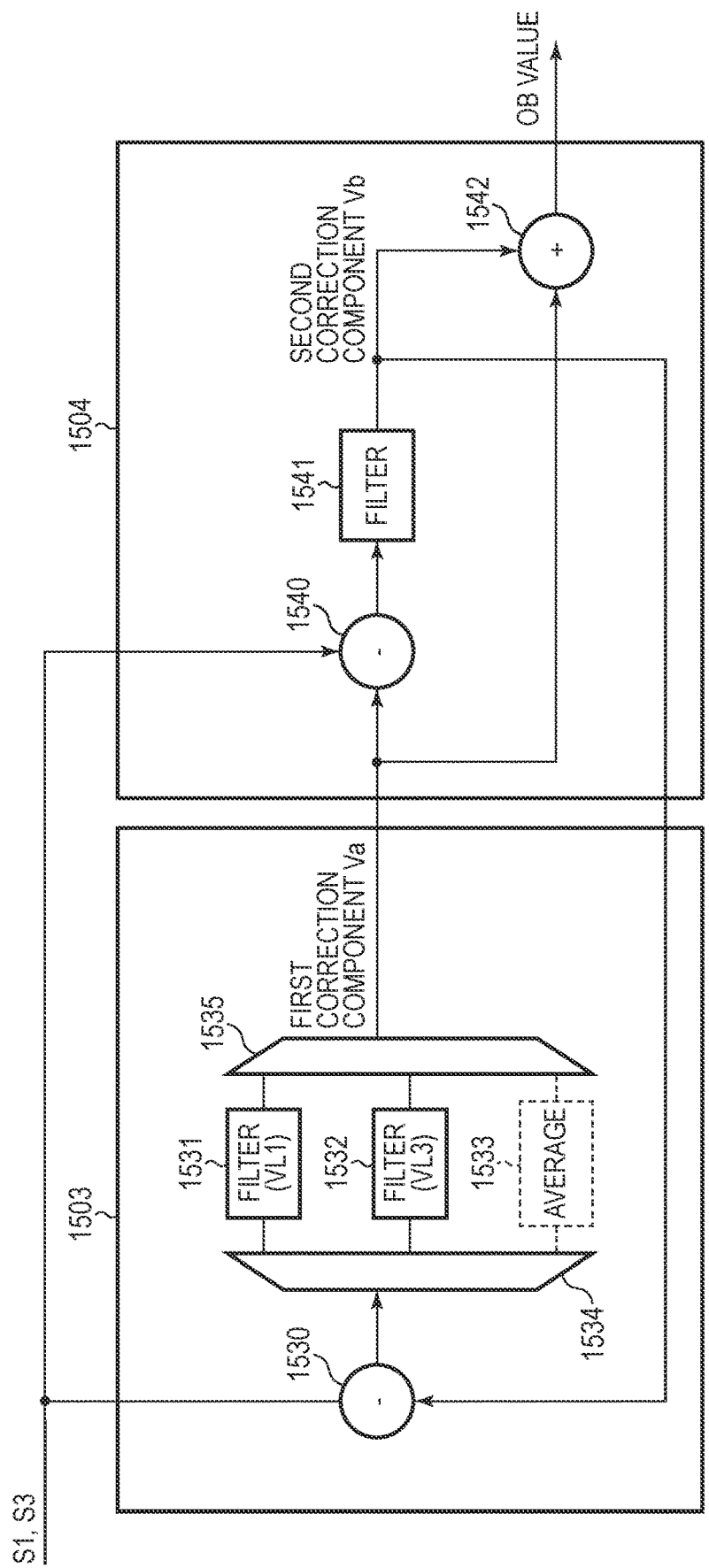

PHOTOELECTRIC CONVERSION DEVICE, IMAGE PROCESSING METHOD, IMAGING SYSTEM, MOBILE BODY, AND EQUIPMENT

BACKGROUND OF THE INVENTION

Field of the Invention

The present invention relates to a photoelectric conversion device, an image processing method, an imaging system, a mobile body, and equipment.

Description of the Related Art

In recent years, a photoelectric conversion device mounted on a digital still camera, a video camera, a mobile phone, or the like has been developed. For example, a CMOS (Complementary Metal Oxide Semiconductor) sensor is widely known as a photoelectric conversion device.

In a CMOS sensor, a row of pixel array in which pixels are arranged in a matrix in a row direction and a column direction is selected, and pixel signals of all pixels of the selected row are simultaneously read out. It is known that an offset is included in a read image signal in a CMOS sensor. Japanese Patent Application Laid-Open No. 2009-005329 and Japanese Patent Application Laid-Open No. 2013-106186 describe a circuit for correcting offsets of pixel signals of effective pixels using pixel signals in an optical black (hereinafter referred to as "OB") region. However, in recent years, the number of rows and the number of vertical signal lines have increased with an increase of image quality of a CMOS sensor, and it is difficult to perform highly accurate correction processing in the configurations described in the Japanese Patent Application Laid-Open No. 2009-005329 and the Japanese Patent Application Laid-Open No. 2013-106186.

SUMMARY OF THE INVENTION

Accordingly, an object of the present invention is to provide a photoelectric conversion device, an image processing method, a photoelectric conversion system, a mobile body, and equipment capable of performing highly accurate correction processing.

A photoelectric conversion device according to an embodiment of the present disclosure includes a pixel unit including a plurality of pixels arranged in a matrix, a driving unit that drives the pixels in a first region by a first method and drives the pixels in a second region by a second method, a calculation unit that calculates a correction value based on pixel values read out from the first region and the second region, and a correction unit that corrects an offset of a pixel value according to incident light based on the correction value, wherein the calculation unit is configured to calculate an initial value of each of a plurality of first correction components based on a first pixel value read out from the first region, update each of the plurality of the first correction components based on a second pixel value read out from the second region and a predetermined second correction component, and calculate the correction value using the updated first correction component and the second correction component.

An image processing method according to another embodiment of the present disclosure includes calculating a first correction component based on first data in a first region of image data, calculating a second correction component using second data in a second region of the image data and the first correction component, updating the first correction component using the second data and the second correction component, and correcting the second data using the updated first correction component and the updated second correction component.

Further features of the present invention will become apparent from the following description of exemplary embodiments with reference to the attached drawings.

BRIEF DESCRIPTION OF THE DRAWINGS

FIGS. 4A, 4B, and 4C are diagrams illustrating driving of the pixel unit by a driving unit according to the first embodiment.

FIGS. 7A, 7B, 7C, and 7D are block diagrams of a first processing unit and a second processing unit according to the first embodiment.

DESCRIPTION OF THE EMBODIMENTS

Embodiments of the present invention will now be described with reference to the accompanying drawings. The embodiments can be arbitrarily combined as long as there is no contradiction. In each of the embodiments described below, an imaging device will be mainly described as an example of a photoelectric conversion device. However, the embodiments are not limited to the imaging device, and can be applied to other examples of the photoelectric conversion device. For example, the embodiments can be applied to a distance measuring device (device such as distance measurement using focus detection and TOF (Time Of Flight)), a photometric device (a device such as measuring the amount of incident light), and the like.

First Embodiment (Overall Configuration)

Figure 1:
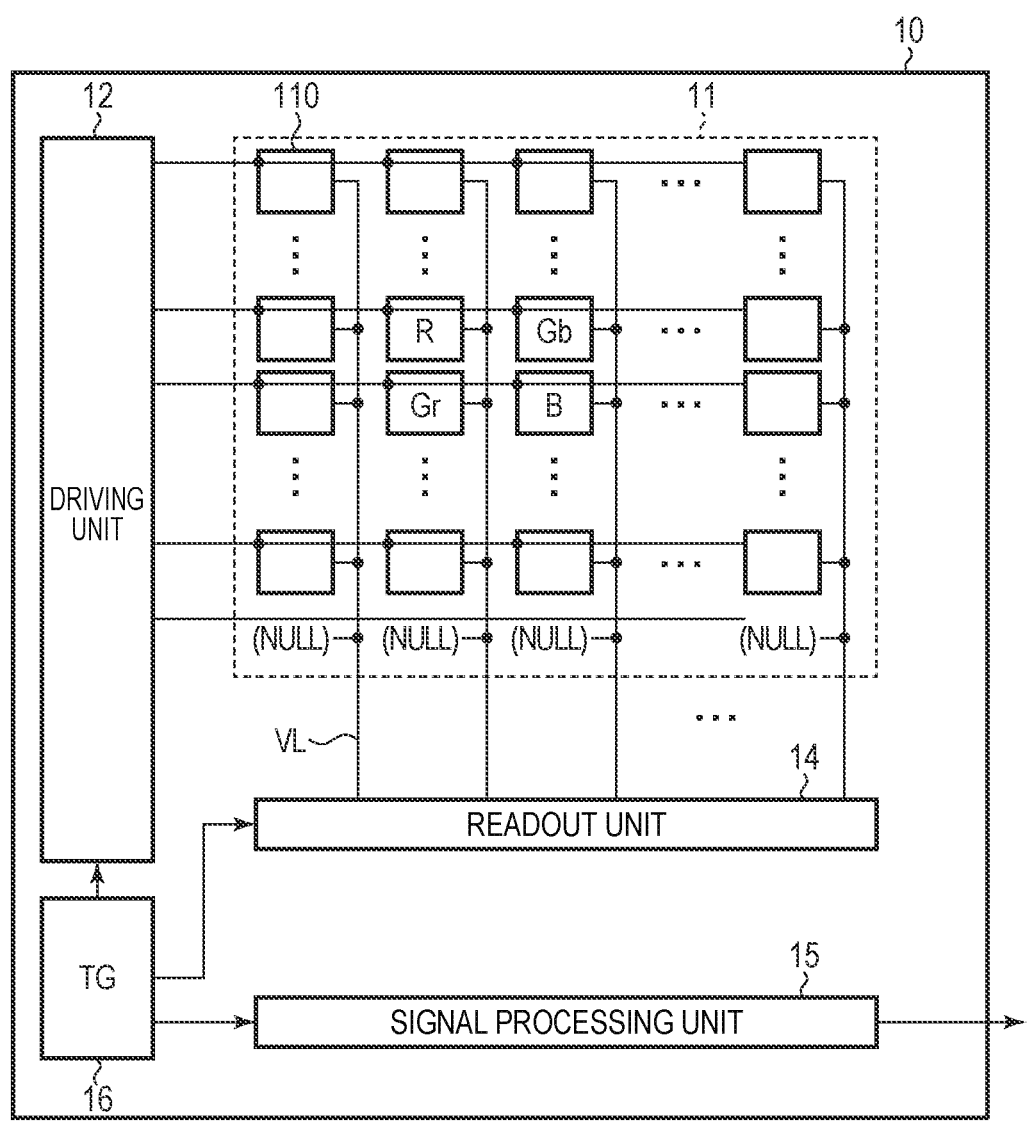
FIG. 1 is a block diagram of a photoelectric conversion device according to a first embodiment.

Referring to FIG. 1, a circuit configuration of a photoelectric conversion device 10 according to the present embodiment will be described. The photoelectric conversion device 10 is, for example, a CMOS image sensor, and includes a pixel unit 11, a driving unit 12, a readout unit 14, a signal processing unit 15, and a timing generator (TG) 16.

The pixel unit 11 includes a plurality of pixels 110 arranged in a two-dimensional array, and each of the pixels 110 includes a photoelectric conversion portion that generates and accumulates signal charges according to the amount of received light. Note that in this specification, a row direction indicates a horizontal direction in a drawing, and a column direction indicates a vertical direction in the drawing. Microlenses and color filters may be disposed on the pixels 110. The color filters are, for example, primary color filters of red (R), blue (B), and green (Gr, Gb), and are provided in the pixels 110 in accordance with a Bayer layout. Some of the pixels 110 are shielded from light as OB (optical black) pixels. The pixel unit 11 may be provided with NULL pixels which are not connected to the vertical signal line VL. Further, the pixel unit 11 may include distance measurement rows in which focus detection pixels for outputting pixel signals for focus detection are arranged, and a plurality of imaging rows in which imaging pixels for outputting pixel signals for generating an image is arranged. The vertical signal line VL is provided for each column of the pixels 110, and the pixels 110 in the same column output pixel signals to a common vertical signal line VL. Although not shown, a constant current circuit is connected to each of the vertical signal lines VL, and the constant current circuit functions as a load circuit of the pixels 110.

The driving unit 12 includes shift registers, gate circuits, buffer circuits, and the like, and outputs a control signal to the pixels 110 based on a vertical synchronization signal, a horizontal synchronization signal, a clock signal, and the like, thereby driving the pixels 110 for each row. In the present embodiment, the driving unit 12 can perform vertical scan in which four rows in the pixel unit 11 are sequentially selected in one horizontal scanning period. The pixels 110 of the selected four rows are read by the readout unit 14 via the vertical signal line VL. In the following description, four rows of the vertical signal lines VL that can be read at the same time are referred to as vertical signal lines VL1 to VL4. Pixel signals are read from the vertical signal lines VL1 to VL4 for each horizontal scanning period (hereinafter, it may be referred to as "1H"), and a calculation processing of OB correction value is executed.

The readout unit 14 can read out pixel signals from the pixels 110 via the vertical signal lines VL, and includes an amplifier circuit, an ADC (Analog to Digital Converter) circuit, a column memory, a horizontal scanning circuit, and the like. The readout unit 14 can simultaneously read out pixel signals from the vertical signal lines VL, for example, four rows, and output digital data (pixel values).

The signal processing unit 15 performs digital signal processing such as OB clamp, digital gain, digital correlated double sampling, digital offset, linearity correction and the like on the pixel data output from the readout unit 14. In the present embodiment, the signal processing unit 15 can perform the digital signal processing such as CDS (Correlated Double Sampling) processing and OB clamp on pixel signals of four rows in one horizontal scanning period. The signal processing unit 15 includes a LVDS (Low Voltage Differential Signaling) serial output circuit, and outputs the signal-processed digital signal to the outside of the photoelectric conversion device at high speed and at low power consumption.

(Pixel Unit)

Figure 2:
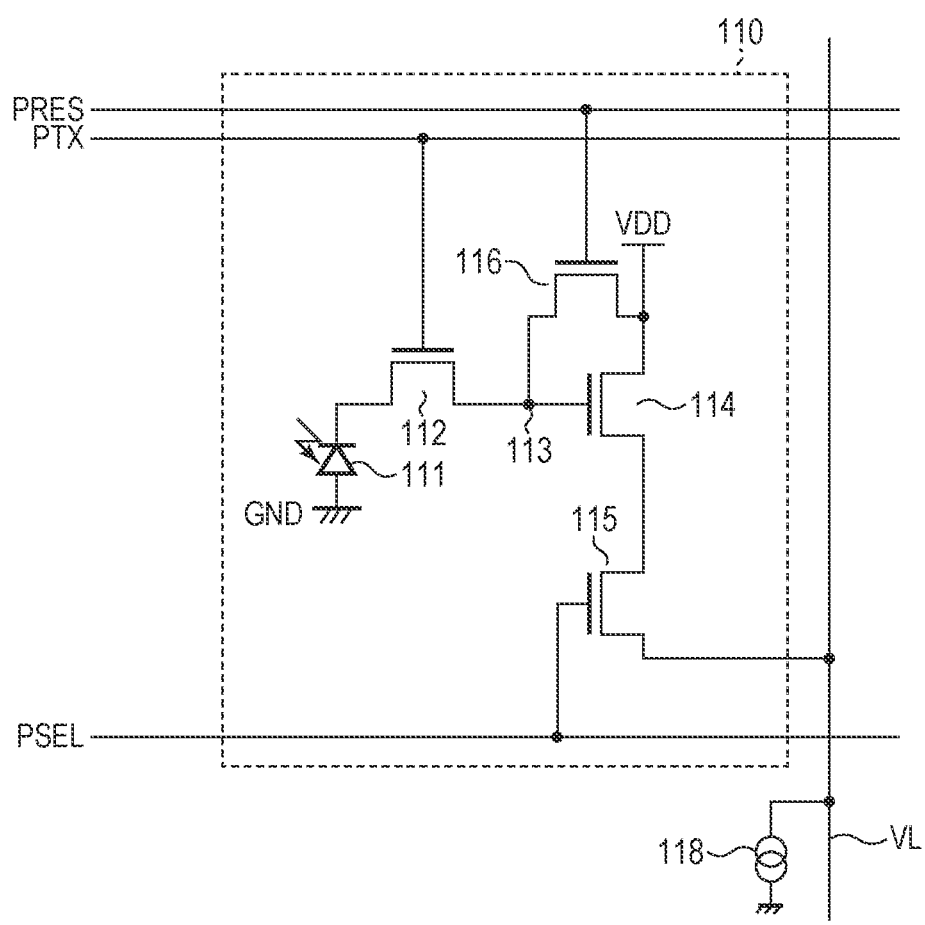
FIG. 2 is an equivalent circuit diagram of a pixel according to the first embodiment.

FIG. 2 is a diagram illustrating a configuration example of the pixel 110 according to the present embodiment. As shown in FIG. 1, the pixels 110 are arranged in a matrix over rows and columns. The pixel 110 may include, for example, a photoelectric conversion portion 111, a transfer transistor 112, a floating diffusion (FD) 113, an amplification transistor 114, a selection transistor 115, and a reset transistor 116.

The photoelectric conversion portion 111 includes, for example, a photodiode. An anode of the photoelectric conversion portion 111 is connected to a ground node (GND), and a cathode of the photoelectric conversion portion 111 is connected to a source of the transfer transistor 112. A drain of the transfer transistor 112 is connected to a source of the reset transistor 116 and a gate of the amplification transistor 114. The connection node of the drain of the transfer transistor 112, the source of the reset transistor 116, and the gate of the amplification transistor 114 is a so-called floating diffusion (FD) 113. The FD 113 includes a capacitance and can function as a charge holding unit and a charge-voltage conversion unit. The drain of the reset transistor 116 and the drain of the amplification transistor 114 are connected to a power supply node (voltage VDD). The source of the amplification transistor 114 is connected to the drain of the selection transistor 115. The source of the selection transistor 115 is connected to the vertical signal line VL. Note that the term "source" and "drain" of a transistor may be changed depending on the conductivity type, application, or the like of the transistor, and the term "source" and "drain" may be reversed.

Each row selection line includes a signal line connected to the gate of the transfer transistor 112, a signal line connected to the gate of the reset transistor 116, and a signal line connected to the gate of the selection transistor 115. A signal line connected to the gate of the transfer transistor 112 is supplied with a control signal PTX from the driving unit 12. A signal line connected to the gate of the reset transistor 116 is supplied with a control signal PRES from the driving unit 12. A signal line connected to the gate of the selection transistor 115 is supplied with a control signal PSEL from the driving unit 12. When each transistor is formed of an N-type transistor, the transistor is turned on by a high-level control signal and turned off by a low-level control signal.

When light is incident on the pixel unit 11, the photoelectric conversion unit 111 of each pixel 110 converts (photoelectrically converts) the incident light into a charge corresponding to the amount of light and accumulates the generated charge. When the transfer transistor 112 is turned on, the charge of the photoelectric conversion portion 111 is transferred to the FD 113. The FD 113 holds the charges transferred from the photoelectric conversion portion 111. The charge transferred from the photoelectric conversion portion 111 is converted into a voltage by a capacitance component of the FD 113.

A voltage VDD is supplied to the drain of the amplification transistor 114, and a bias current is supplied from the current source 118 to the source of the amplification transistor 114 via the selection transistor 115. The amplification transistor 114 functions as an amplification unit (source follower circuit) having a gate as an input node. Accordingly, the amplification transistor 114 outputs a signal based on the voltage of the FD 113 to the vertical signal line VL via the selection transistor 115. The reset transistor 116 is turned on and resets the FD 113 to a voltage corresponding to the voltage VDD.

The transfer transistor 112, the reset transistor 116, and the selection transistor 115 of the pixel 110 are controlled on row-by-row basis by control signals PTX, PRES, and PSEL supplied from the driving unit 12. Normal readout of the pixels 110 will be described. The pixel 110 is reset except for the accumulation period (between shutter scan and readout scan described later). In the shutter scan, when the reset state by the reset transistor 116 is released, the photoelectric conversion portion 111 starts accumulation of charges. Next, after a predetermined accumulation time, the readout scan is performed. In the readout scan, the row is selected, and the pixel signal (N-signal) at the reset level of the FD 113 is read out. Then, the charge of the photoelectric conversion portion 111 is transferred to the FD 113, and a pixel signal (S-signal) based on the charge is read out. Then, the photoelectric conversion portion 111 and the FD 113 are reset. By calculating (CDS processing) a difference between the S-signal and the N-signal in the signal processing unit 15, a pixel signal based on the charge accumulated in the photoelectric conversion portion 111 is obtained.

Figure 3A:
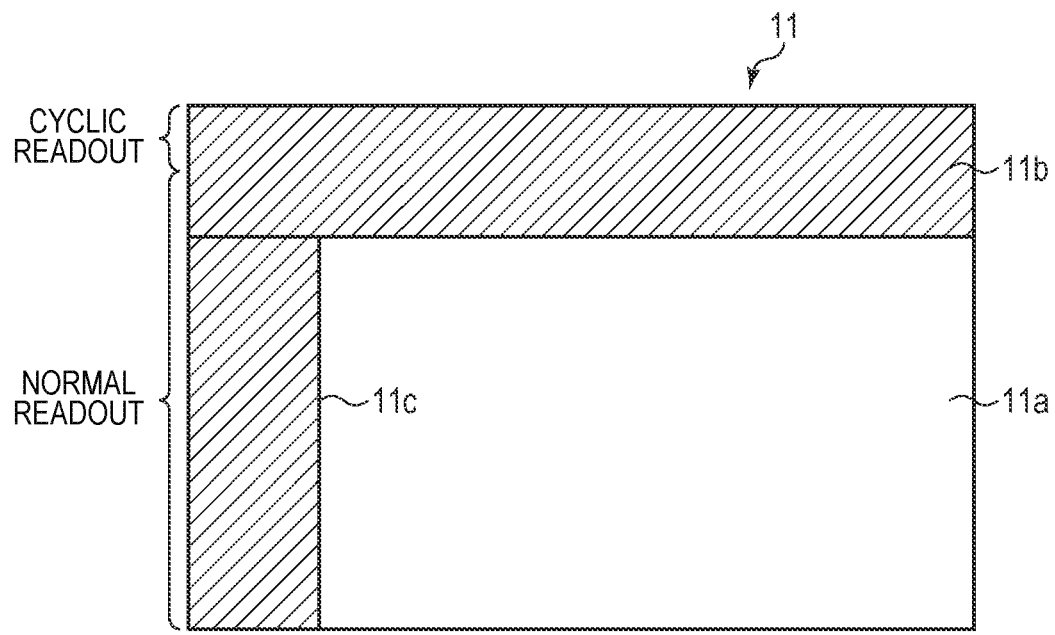
FIGS. 3A and 3B are diagrams illustrating a pixel unit according to the first embodiment.
Figure 3B:
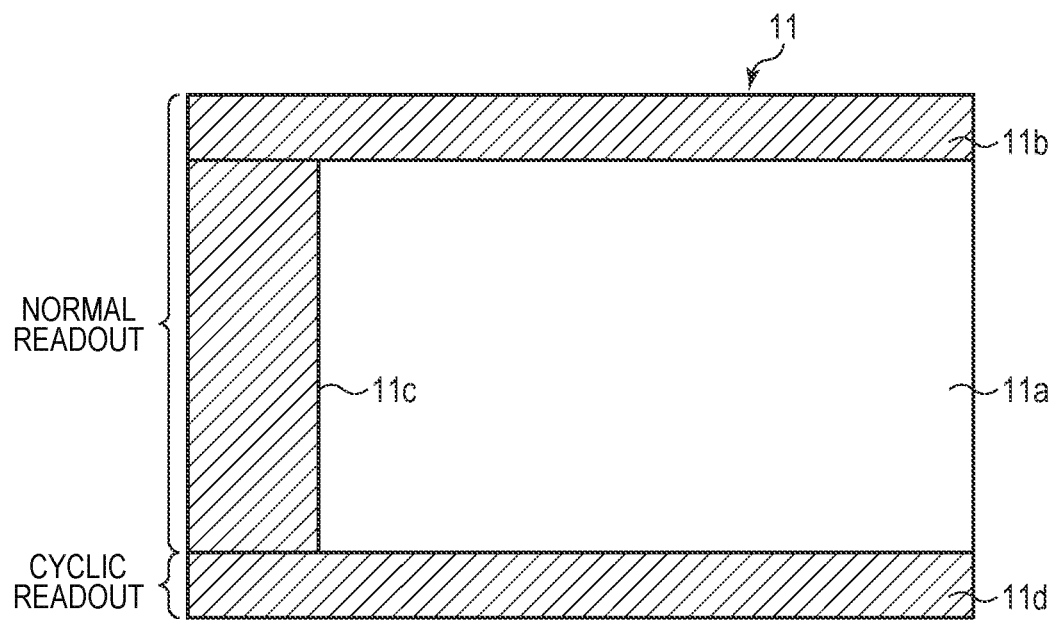

FIGS. 3A and 3B are diagrams illustrating a pixel unit according to the present embodiment. The pixel unit 11 shown in FIG. 3A includes an opening region 11a and OB regions 11b and 11c, and the pixel unit 11 shown in FIG. 3B includes an opening region 11a and OB regions 11b, 11c and 11d. The opening region 11a includes pixels 110 which are not shielded from light, and can output pixel signals corresponding to incident light. The OB regions 11b, 11c, and 11d include light-shielded pixels 110 or NULL pixels not connected to the vertical signal line VL, and are used for offset correction or the like. In FIGS. 3A and 3B, the OB region 11b is arranged in the upper rows of the opening region 11a, and the OB region 11c is arranged in the left columns of the opening region 11a. In FIG. 3B, the OB region 11d is positioned in rows below the opening region 11a. The position of the OB region is not limited to FIGS. 3A and 3B, and the OB region may be provided in the right columns of the opening region 11a.

As will be described later, the photoelectric conversion device according to the present embodiment can perform a cyclic readout for continuously reading pixels 110 of a plurality of rows a plurality of times and a normal readout other than the cyclic readout. For example, as shown in FIG. 3A, the cyclic readout may be performed in the upper rows of the divided OB region 11b, or may be performed in the OB region 11d provided below the opening region 11a as shown in FIG. 3B. In either case, the normal readout may typically be performed after the cyclic readout.

(Driving Unit)

The driving unit 12 according to the present embodiment can realize various kinds of driving in the pixel unit 11 for shutter driving and calculation of OB values.

Figure 4A:
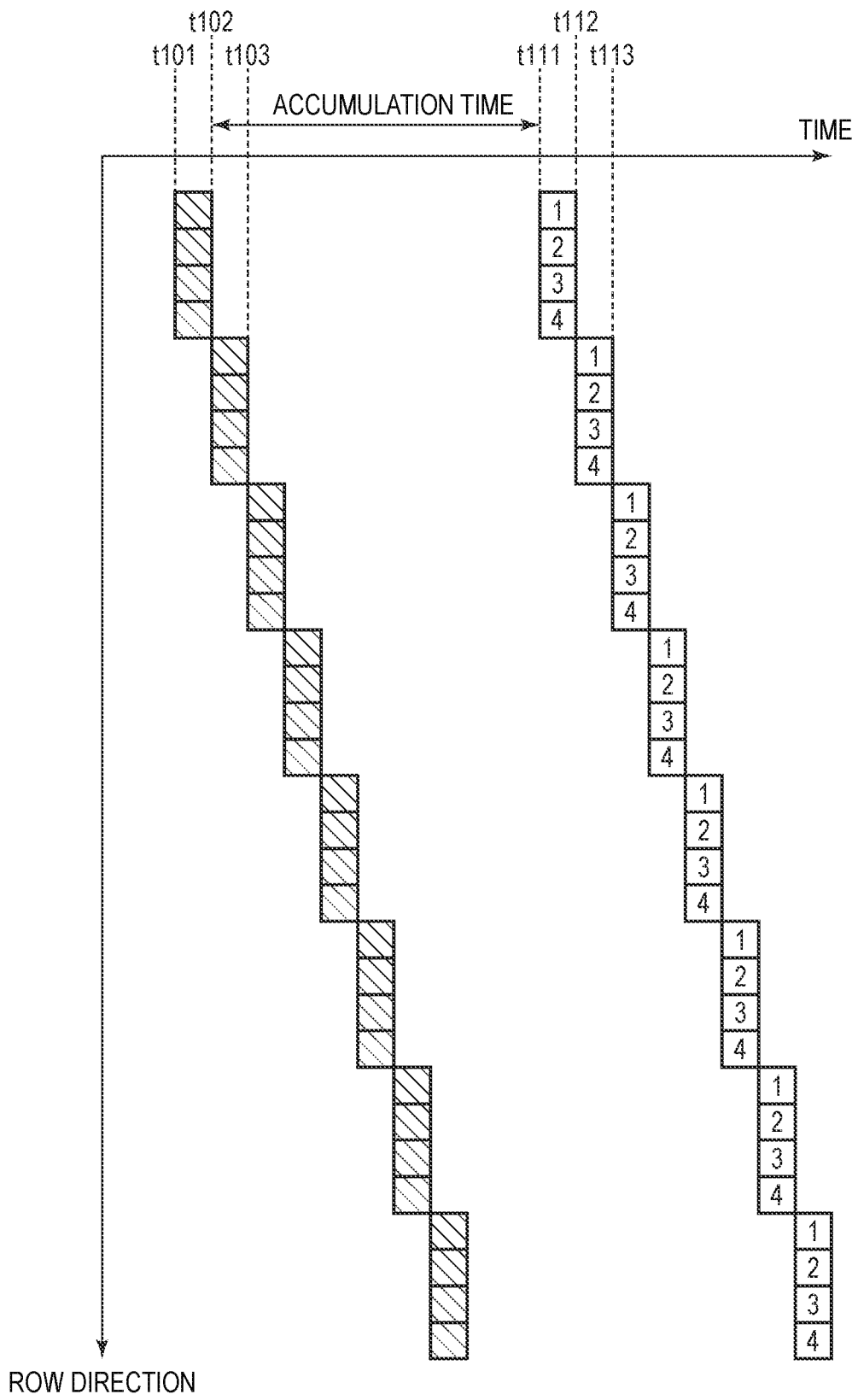
Figure 4C:
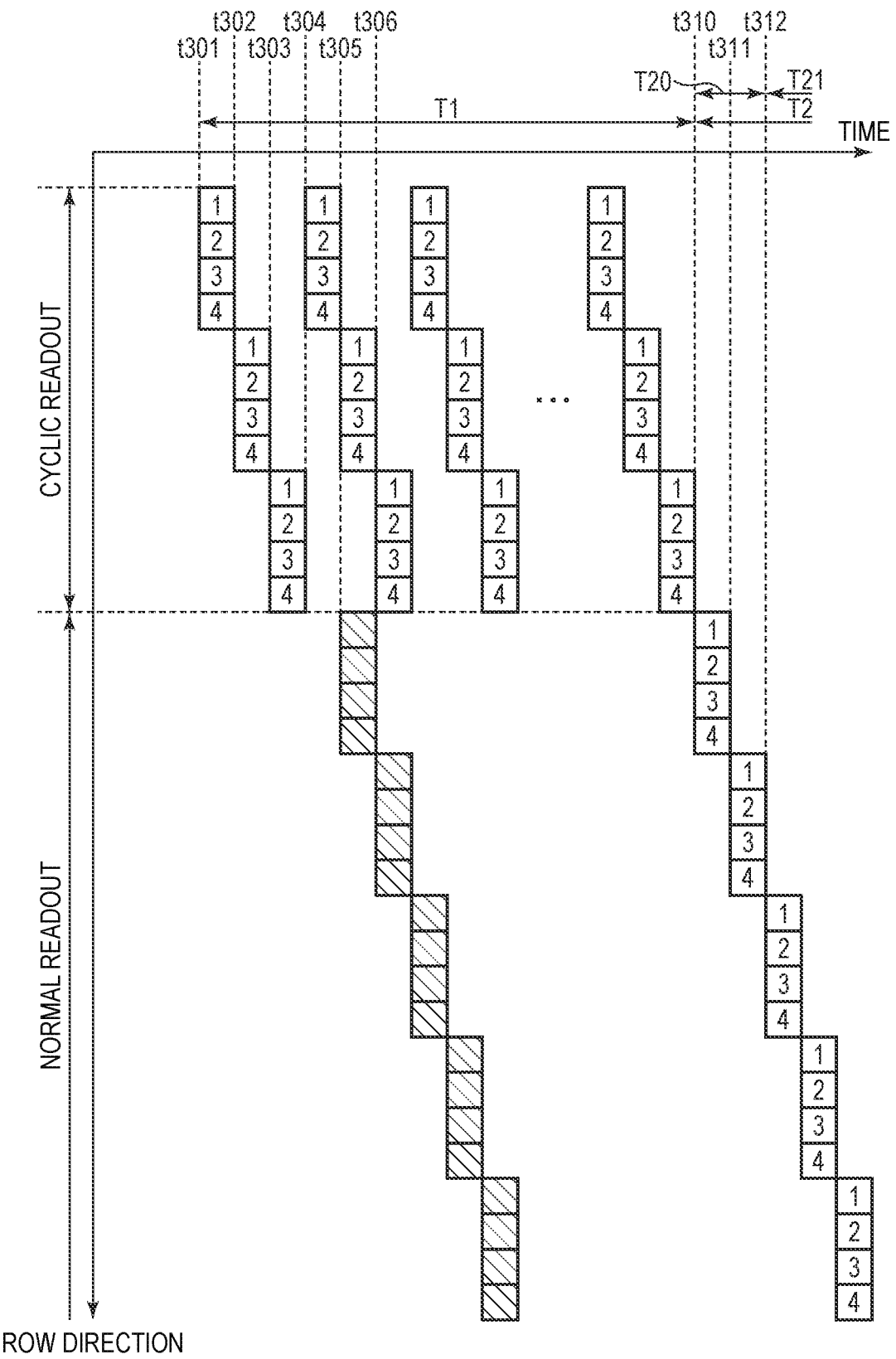

FIGS. 4A, 4B, and 4C are diagrams illustrating driving of the pixel unit 11 by the driving unit 12 according to the present embodiment. In the drawing, the horizontal axis represents time, and the vertical axis represents the row direction (vertical direction) of the pixel device. Hatched rectangles represent shutter scans, and white rectangles represent readout scans. Numerals in the rectangle in the readout scan correspond to the vertical signal lines VL1 to VL4.

FIG. 4A is a diagram illustrating driving of the pixel unit 11 by the driving unit 12 according to the present embodiment, and illustrates shutter driving. At time t101, the driving unit 12 performs the shutter scan by setting the control signals PTX and PRES of the first to fourth rows to a high level, and resets the charges of the photoelectric conversion portions 111 and FDs 113 of the pixels 110 to the voltage VDD. Subsequently, the driving unit 12 changes the control signals PTX and PRES of the first to fourth rows from the high level to the low level, and the photoelectric conversion portion 111 starts accumulation of charges according to the incident light. At time t102, the driving unit 12 sets the control signals PTX and PRES of the fifth to eighth rows to a high level, and resets the charges of the photoelectric conversion portions 111 and FDs 113 of the pixels 110 to the voltage VDD. Subsequently, the driving unit 12 changes the control signals PTX and PRES from the high level to the low level, and the photoelectric conversion portion 111 starts accumulation of charges according to the incident light. Similarly, after time t103, the driving unit 12 performs the shutter scan for every four rows.

At time t111 to t112 after a predetermined accumulation time (exposure time) from the shutter scan, the driving unit 12 performs the readout scan of the first to fourth rows. That is, the driving unit 12 sets the control signal PSEL of the first to fourth rows to a high level, and turns on the selection transistors 115. Thus, the N-signal at the time of the reset is output from the pixel 110 to each of the vertical signal lines VL1 to VL4. Subsequently, the driving unit 12 sets the control signals PTX of the first to fourth rows to a high level, and turns on the transfer transistors 112. Thus, the charges accumulated in the photoelectric conversion portion 111 are transferred to the FD 113. The voltage of the FD 113 decreases according to the transferred charge, and the S-signal is output from the source of the amplification transistor 114 to each of the vertical signal lines VL1 to VL4 via the selection transistors 115. That is, the pixel signals of the pixels 110 in the first to fourth rows are simultaneously read out via the vertical signal lines VL1 to VL4.

At time t112 to t113, the driving unit 12 sets the control signal PSEL of the fifth to eighth rows to a high level, and then sets the control signal PTX to a high level. Thus, pixel signals are sequentially output from the pixels 110 in the fifth to eighth rows to the vertical signal lines VL1 to VL4. In this manner, in the pixel unit 11, the readout scan is performed for every four rows. Numerals in the rectangle of the readout scan correspond to the vertical signal lines VL1 to VL4. That is, the pixels 110 in the first row, the fifth row, the ninth row, . . . , and the (4×N−3)th row are read out via the vertical signal line VL1, and the pixels 110 in the second row, the sixth row, the tenth row, . . . , and the (4×N−2)th row are read out via the vertical signal line VL2. The pixels 110 of the third, seventh, eleventh, . . . , and (4×N−1)th rows are read out via the vertical signal line VL3, and the pixels 110 of the fourth, eighth, twelfth, . . . , and (4×N)th rows are read out via the vertical signal line VlA.

The driving unit 12 may perform various kinds of driving as well as the normal readout driving, and may perform readout of the NULL pixels, for example. Further, the driving unit 12 may perform N-N readout driving for reading the S-signal in a state where the transfer transistor is turned off after reading the N-signal. Further, the driving unit 12 can perform the cyclic readout driving for repeatedly reading out a predetermined region.

FIG. 4B is a diagram illustrating driving of the pixel unit 11 by the driving unit 12 according to the present embodiment, and shows driving of the cyclic readout. As shown in FIGS. 3A and 3B, the cyclic readout can be performed in the OB region 11b or the OB region 11d.

At time t201 to t202, the driving unit 12 sequentially turns on the selection transistors 115 and the transfer transistors 112 of the first to fourth rows, and outputs the pixel signals of the N-signals and the S-signals from the pixels 110 to the vertical signal lines VL1 to VL4. Similarly, at time t202 to t203, the driving unit 12 outputs the pixel signals from the pixels 110 in the fifth to eighth rows to the vertical signal lines VL1 to VL4, and at time t203 to t204, the driving unit 12 outputs the pixel signals from the pixels 110 in the ninth to twelfth rows to the vertical signal lines VL1 to VL4. At time t204 to t205, the driving unit 12 outputs the pixel signals from the pixels 110 in the first to fourth rows to the vertical signal lines VL1 to VL4 again, and at time t205 to t206, the driving unit 12 outputs the pixel signals from the pixels 110 in the fifth to eighth rows to the vertical signal lines VL1 to VL4. Similarly, in the pixels 110 of the first to twelfth rows, the readout scan is repeatedly performed every four rows.

In the cyclic readout described above, the shutter scan is not necessarily performed, and in this case, the period of the readout scan corresponds to the accumulation time. Although the shutter scan may be performed between the readout scan and the next readout scan, the cycle of the readout scan becomes the upper limit of the accumulation time. Although there is a restriction on the accumulation time, a large amount of data can be obtained in a short time from a small region by the cyclic readout.

FIG. 4C is a diagram illustrating driving of the pixel unit 11 by the driving unit 12 according to the present embodiment, and illustrates driving in which the normal readout is performed after the cyclic readout.

In the following description of the present embodiment, it is assumed that the normal readout is performed after the cyclic readout is performed in a part of the OB region 11b. The normal readout can be performed in the remaining region where the cyclic readout is not performed in the OB region 11b, the OB region 11c, the opening region 11a, and the like. As shown in FIG. 3A, the upper region of the OB region 11b may be assigned to the cyclic readout, and the lower region of the OB region 11b may be assigned to the normal readout. Further, as shown in FIG. 3B, the OB region 11d positioned below the opening region 11a may be assigned to the cyclic readout, and the OB region 11b positioned above the opening region 11a may be assigned to the normal readout. When the cyclic readout is performed in the opening region 11a, the N-N readout may be preferably performed. In either case, the cyclic readout may be followed by the normal readout.

In the following description, it is assumed that the cyclic readout is performed in the 12 rows of the OB region 11b, for example. The readout for three horizontal scanning periods is repeated eight times, and the cyclic readout data for 24 horizontal scanning periods is obtained. The cyclic readout data may be referred to as preliminary data or reference data, and the normal readout data may be referred to as main data.

In the cyclic readout period T1, the cyclic readout is performed for every four rows in the 12 rows of the OB region 11b. That is, at time t301 to t302, the driving unit 12 performs the readout scan of the first to fourth rows, and outputs the pixel signals of the N-signal and the S-signal from the pixels 110 to the vertical signal lines VL1 to VL4. Similarly, the driving unit 12 performs the readout scan (time t302 to t303) of the fifth to eighth rows, the readout scan (time 303 to t304) of the ninth to twelfth rows, and the readout scan (time t304 to t305) of the first to fourth rows. Further, at time t305 to t306, the driving unit 12 performs the readout scan of the fifth to eighth rows and shutter scan of the thirteenth to sixteenth rows of the opening region 11a. Similarly, the shutter scan is performed following the cyclic readout. The pixel signal at the time of the cyclic readout is used as an initial value of a first correction component described later.

In the normal readout period T2 after the cyclic readout period T1, the normal readout is performed for every four rows in the remaining region, the OB region 11c, and the opening region 11a in which the cyclic readout is not performed in the OB region 11b. At time 310 to t311, the driving unit 12 outputs the pixel signals of the N-signals and the S-signals from the pixels 110 of the thirteenth to sixteenth rows to the vertical signal lines VL1 to VL4. Similarly, at time t311 to t312, the driving unit 12 outputs pixel signals from the pixels 110 in the seventeenth to twentieth rows to the vertical signal lines VL1 to VL4. The pixel signal in the period T20 (time t310 to t312) is used as an initial value of the filter unit of the signal processing unit 15 as described later. In a period T21 after the time t312, the signal processing unit 15 calculates a second correction component depending on the vertical position using the pixel signals at the time of the normal readout. Further, the signal processing unit 15 continues to update the first correction components sequentially using the pixel signals and the second correction components. The details will be described later.

(Signal Processing Unit)

Figure 5:
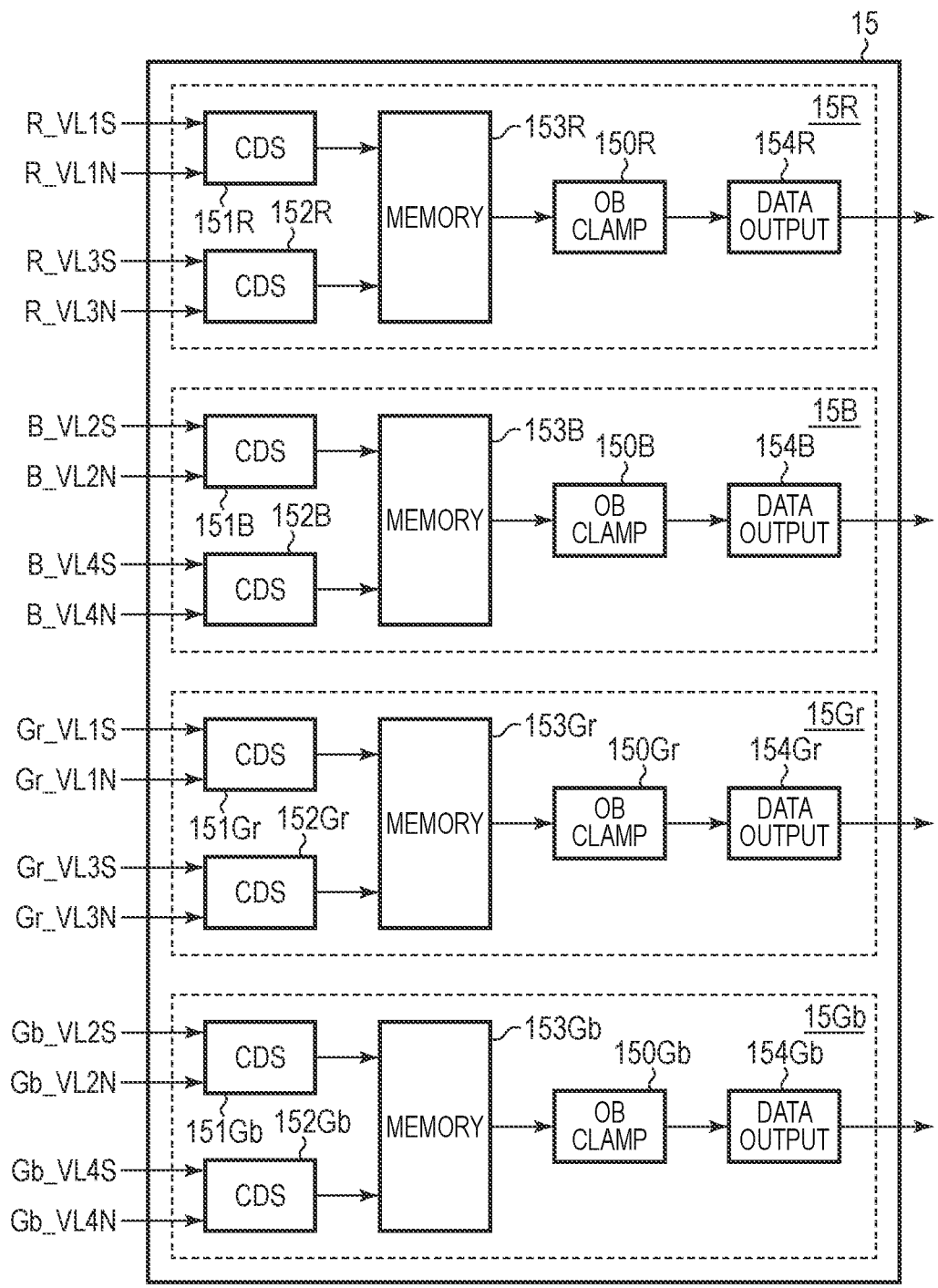
FIG. 5 is a block diagram of a signal processing unit in the calculation unit according to the first embodiment.

FIG. 5 is a block diagram of the signal processing unit 15 according to the present embodiment. The signal processing unit 15 includes calculation units 15R, 15B, 15Gr, and 15Gb for each color of the color pixels 110 arranged in a Bayer layout. That is, the signal processing unit 15 includes a calculation unit 15R that processes the signals of the R pixels 110, a calculation unit 15B that processes the signals of the B pixels 110, a calculation unit 15Gr that processes the signals of the Gr pixels 110, and a calculation unit 15Gb that processes the signals of the Gb pixels 110. The calculation unit 15R processes the signals of the R pixels 110 read through the vertical signal lines VL1 and VL3, and the calculation unit 15B processes the signals of the B pixels 110 read through the vertical signal lines VL2 and VL4. The calculation unit 15Gr processes the signals of the Gr pixels 110 read out via the vertical signal lines VL1 and VL3, and the calculation unit 15Gb processes the signals of the Gb pixels 110 read out via the vertical signal lines VL2 and VL4.

The calculation unit 15R includes CDS calculation units 151R and 152R, a memory unit 153R, an OB clamp calculation unit 150R, and a data output unit 154R. The CDS calculation units 151R and 152R calculate a difference value between the S-signal and the N-signal read from the column memory in the readout unit 14 via the vertical signal line VL1, and output the difference value to the memory unit 153R. That is, the CDS calculation unit 151R calculates a difference value between the S-signal R_VL1S and the N-signal R_VL1N read from the R pixel 110 via the vertical signal line VL1. Similarly, the CDS calculation unit 152R calculates a difference value between the S-signal R_VL3S and the N-signal R_VL3N read from the R pixel 110 via the vertical signal line VL3.

The memory unit 153R can hold data of two rows (one horizontal scanning period) of the R pixels 110 read out via the vertical signal lines VL1 and VL3. The memory unit 153R alternately outputs the data of the vertical signal line VL1 and the data of the vertical signal line VL3 to the OB clamp calculation unit 150R every half (½) horizontal scanning period. At this time, the memory unit 153R adds an identifier (vertical signal line identifier) to the date. The identifier indicates the vertical signal line VL from which each data is read out. The OB clamp calculation unit 150R calculates the OB value mainly using the data of the OB region 11b and subtracts the OB value from the data of the opening region 11a to realize the OB clamp operation (OB value correction operation). The OB value includes a dark current, a circuit-dependent component, and the like, and the OB value includes a difference value for each vertical signal line VL, i.e., a difference value between the vertical lines.

Therefore, the OB clamp calculation unit 150R separately calculates the OB value of the vertical signal line VL1 and the OB value of the vertical signal line VL3. The OB clamp calculation unit 150R outputs the OB clamped data to the data output unit 154R. The data output unit 154R converts the input data into a predetermined format and outputs the converted data to the outside of the device.

The other calculation units 15B, 15Gr, and 15Gb are configured in the same manner as the calculation unit 15R. That is, the calculation unit 15B can perform the CDS processing and the OB clamp of data of the B pixels 110 read from the vertical signal lines VL2 and VL4. Further, the calculation unit 15Gr can perform the CDS processing and OB clamp of data of the Gr pixels 110 read from the vertical signal lines VL1 and VL3, and the calculation unit 15Gb can perform the CDS processing and the OB clamp of data of the Gb pixels 110 read from the vertical signal lines VL2 and VL4. In this way, the calculation units 15R, 15B, 15Gr, and 15Gb can calculate the OB correction value for each color of the color pixels 110 and perform the OB clamp.

(OB Clamp Calculation Unit)

Figure 6:
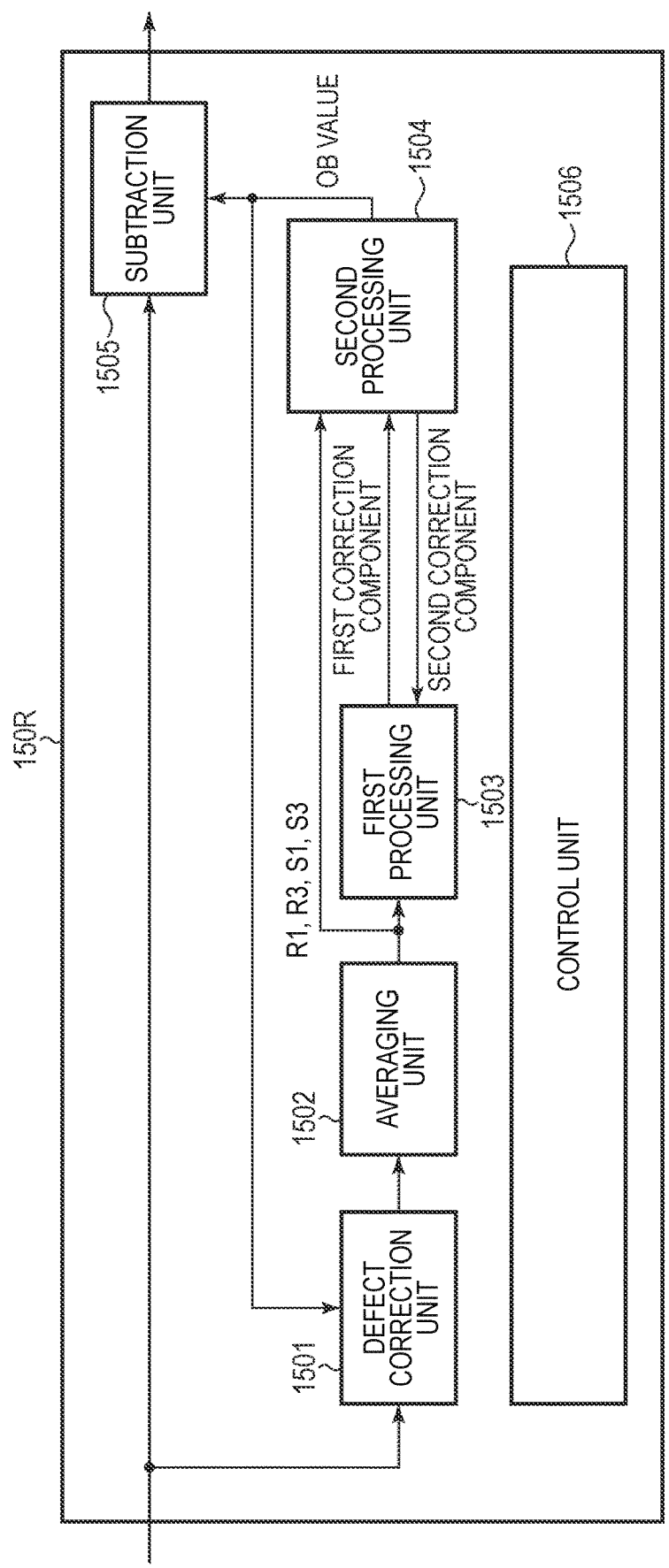
FIG. 6 is a block diagram of an OB clamp calculation unit according to the first embodiment.

FIG. 6 is a block diagram of the OB clamp calculation unit 150R in the calculation unit 15R. Since the other OB clamp calculation units 150B, 150Gr, and 150Gb are similarly configured, the OB clamp calculation unit 150R will be described below. As shown in FIG. 6, the OB clamp calculation unit 150R includes a defect correction unit 1501, an averaging unit 1502, a first processing unit 1503, a second processing unit 1504, a subtraction unit 1505, and a control unit 1506. When the OB value calculation is performed in the data input to the OB clamp calculation unit 150R, the data is input to the defect correction unit 1501. When the OB clamp is performed in the data input to the OB clamp calculation unit 150R, the data is input to the subtraction unit 1505.

The defect correction unit 1501 performs defect correction processing using a predetermined value or an OB value calculated by the second processing unit 1504 as a reference value. Specifically, the defect correction unit 1501 calculates a normal range of the OB value by executing a predetermined calculation on the reference value, and determines data exceeding the normal range as defect data. The data determined as the defect data is replaced with a reference value or deleted. This prevents the data exceeding the normal range from affecting the OB value calculation.

The averaging unit 1502 divides the integrated value of the data by the number of data over a half (½) horizontal scanning period, i.e., one horizontal scanning period for each vertical signal line VL, and calculates an average value. The first processing unit 1503 calculates a first correction component for each vertical signal line VL using the average value calculated by the averaging unit 1502 and the second correction component calculated by the second processing unit 1504. The second processing unit 1504 calculates the second correction component using the average value calculated by the averaging unit 1502 and the first correction component calculated by the first processing unit 1503. The second processing unit 1504 calculates an OB value from the first correction component and the second correction component, and outputs the OB value to the subtraction unit 1505 and the defect correction unit 1501.

The subtraction unit 1505 subtracts the OB value from the input data and performs the OB clamp. The control unit 1506 controls the overall operation of the OB clamp calculation unit 150R. For example, the control unit 1506 determines whether or not the input data is data in a region to be subjected to OB value calculation. Further, the control unit 1506 controls switching of operation modes of the first processing unit 1503 and the second processing unit 1504.

Figure 7A:
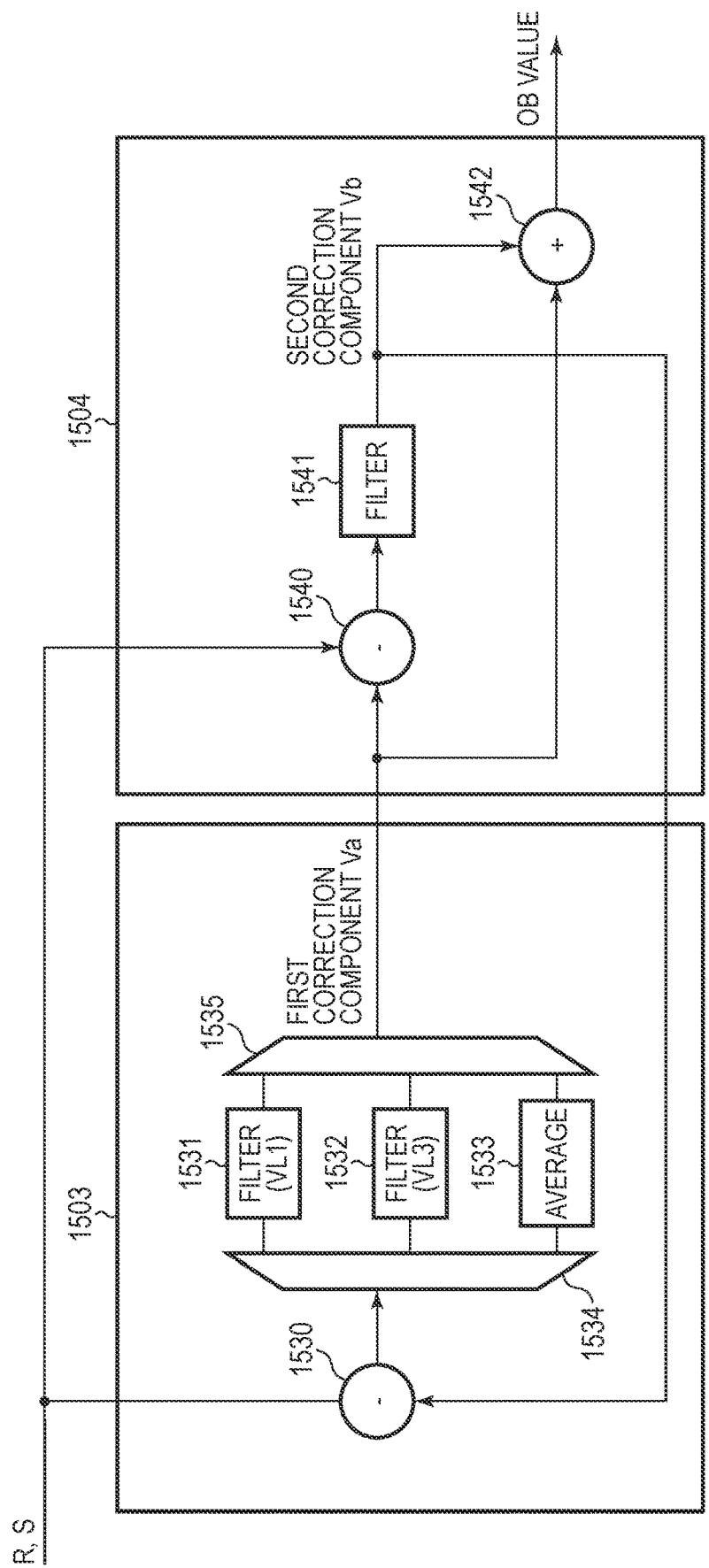
Figure 7B:
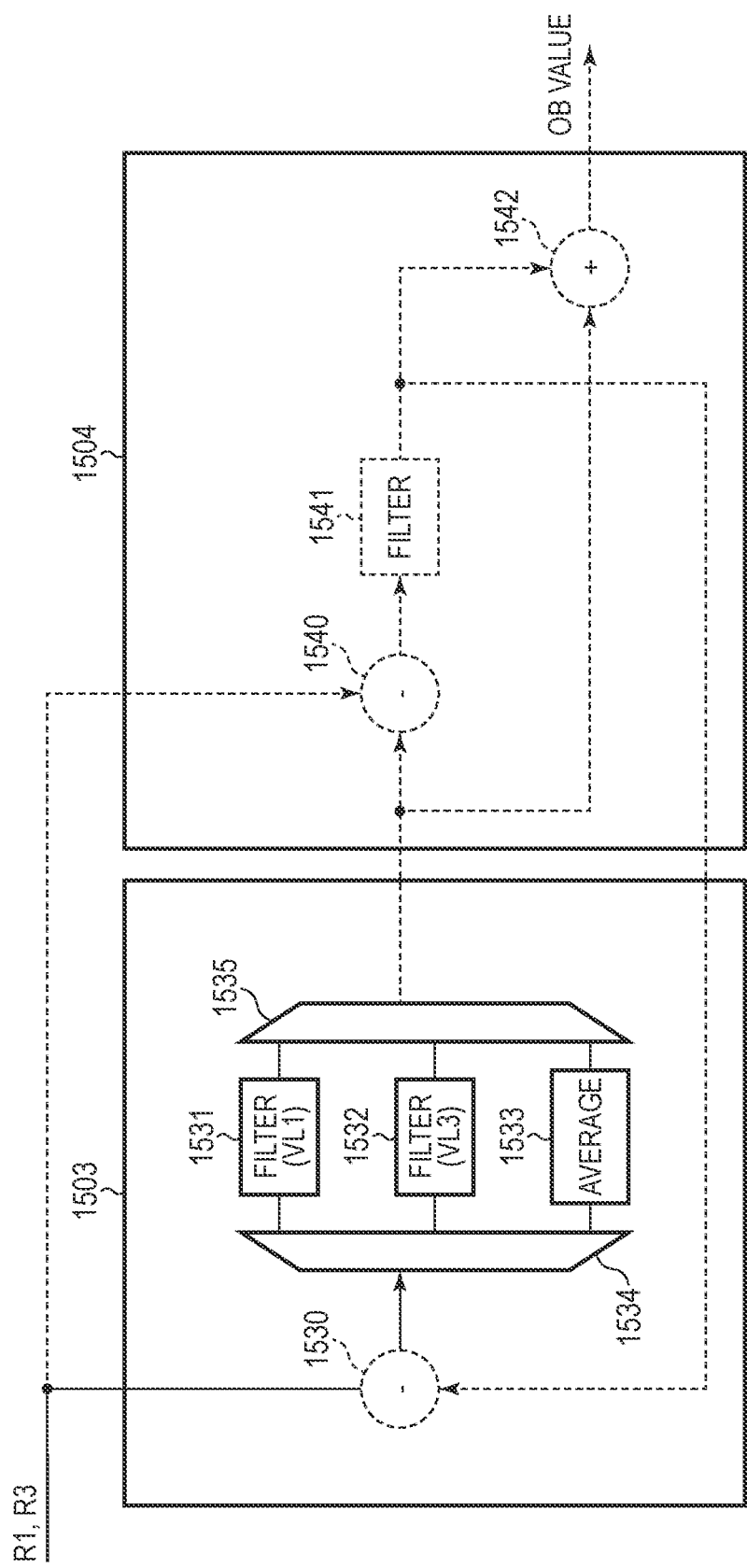
Figure 7C:
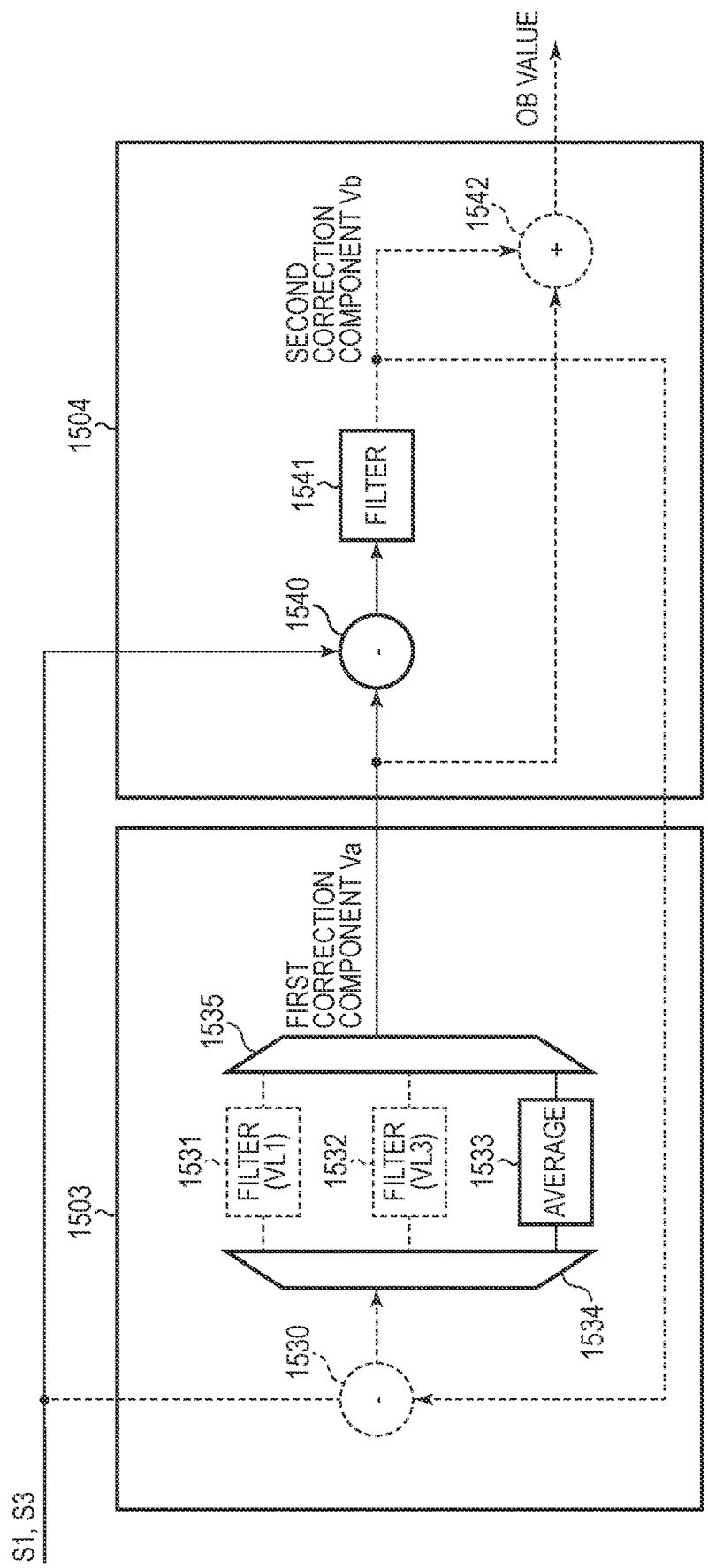

FIGS. 7A, 7B, 7C, and 7D are block diagrams of the first processing unit 1503 and the second processing unit 1504 according to the present embodiment. FIG. 7A illustrates the overall configuration of the first processing unit 1503 and the second processing unit 1504. In FIGS. 7B, 7C, and 7D, a block indicated by a solid line represents an operation state, and a block indicated by a broken line represents a non-operation state.

The first processing unit 1503 includes a subtraction unit 1530, a filter unit 1531, a filter unit 1532, an average value calculation unit 1533, and multiplexers 1534 and 1535. Each of the multiplexers 1534 and 1535 includes a plurality of switch circuits, and switches the switch circuits according to the operation state of the signal processing unit 15. The first processing unit 1503 performs predetermined signal processing on the average values $R_1$ and $R_3$ output from the averaging unit 1502 in FIG. 6, and calculates a first correction component Va dependent on the vertical signal line VL. The second processing unit 1504 includes a subtraction unit 1540, a filter unit 1541, and an addition unit 1542, and updates the second correction component Vb according to the vertical position using the first correction component Va. The addition unit 1542 outputs an addition value of the first correction component Va and the second correction component Vb as the OB value.

In the above-described configuration, each unit may share a hardware configuration as long as equivalent functions can be available. For example, since the filter units 1531 and 1532 alternately operate, the filter units 1531 and 1532 may be configured by a common circuit.

FIG. 7B is a block diagram of the first processing unit 1503 and the second processing unit 1504 according to the present embodiment, and illustrates an operation state in the cyclic readout period T1 (time t301 to t310) of FIG. 4C. The filter unit 1531 calculates an average value $Va_1$ obtained by dividing the integrated value of the average value data $R_1$ from the averaging unit 1502 in FIG. 6 by the number of horizontal scanning periods. That is, the filter unit 1531 calculates the average value $Va_1$ of the data $R_1$ of the vertical signal line VL1 during the same period. Similarly, the filter unit 1532 calculates the average value $Va_3$ of the data $R_3$ of the vertical signal line VL3 during the same period. In this manner, the filter units 1531 and 1532 calculate the average values $Va_1$ and $Va_3$ for each vertical signal line VL based on the cyclic readout data $R_1$ and $R_3$. Further, the average value calculation unit 1533 calculates an average value $Va_0$ of the average value $Va_1$ and the average value $Va_3$. The average value $Va_0$ represents an average value of data of all the vertical signal lines VL in the cyclic readout period. The calculated average values $Va_1$, $Va_3$, and $Va_0$ are classified according to the vertical signal line identifier as initial values of a first correction component to be described later, and are held in the filter unit 1531, the filter unit 1532, and the average value calculation unit 1533. At the end of the cyclic readout (time 310), the first correction components $Va_1$, $Va_3$, and $Va_0$ held in the filter units 1531 and 1532 and the average value calculation unit 1533 are represented by the following formulas (1) to (3), respectively.

$$Va_1 = \frac{1}{N_1}\sum_{k=1}^{N_1} R_{1,k} \qquad (1)$$

-continued $$Va_3 = \frac{1}{N_1}\sum_{k=1}^{N_1} R_{3,k} \qquad (2)$$

$$Va_0 = \frac{1}{2N_1}\sum_{k=1}^{N_1}(R_{1,k} + R_{3,k}) \qquad (3)$$

In the formulas (1) to (3), "$R_{1,k}$" and "$R_{3,k}$" represent data $R_1$ and $R_3$ at the time of the cyclic readout of the vertical signal lines VL1 and VL3 in the k-th horizontal scanning period, respectively. "N1" denotes the number of horizontal scanning periods of the cyclic readout, and "k" denotes the k-th horizontal scanning period among the first to N1-th horizontal scanning periods.

In general, since a difference between the vertical lines does not depend on the accumulation time, a difference between the first correction component $Va_1$ and the first correction component $Va_1$ corresponds to the difference between the vertical lines. Further, averaging the data $R_1$ and $R_3$ at the time of the cyclic readout for each horizontal scanning period in the horizontal scanning period of N1 can reduce random noise included in the data $R_1$ and $R_3$. The first correction components $Va_1$, $Va_3$, and Van as initial values may be representative values of respective target regions (vertical signal lines VL), and may be median values, for example.

FIG. 7C is a block diagram of the first processing unit 1503 and the second processing unit 1504 according to the present embodiment, and illustrates an operation state in the normal readout period T20 (time t310 to t312) of FIG. 4C. As described above, the data $S_1$ and $S_3$ at the time of the normal readout are included in the period T20 of the several horizontal scanning periods in the beginning of the normal readout period T2. The data $S_1$ and $S_3$ in the period T20 are used to calculate the initial value of the filter unit 1541. The data $S_1$ and $S_3$ averaged by the averaging unit 1502 are input to the second processing unit 1504. The first correction component Va calculated by the average value calculation unit 1533 is output to the second processing unit 1504, and the subtraction unit 1540 calculates a difference value between the data $S_1$ and $S_3$ and the first correction component Va. The filter unit 1541 obtains an average value $Vb_0$ obtained by dividing the integrated value of the difference by the number of horizontal scanning periods N2. The average value $Vb_0$ is used as an initial value of the second correction component Vb described later. At the time (312) when the first period T20 of the normal readout ends, the second correction component $Vb_0$ held in the filter unit 1541 is represented by the following formula (4).

$$Vb_0 = \frac{1}{2N_2}\sum_{k=1}^{N_2}(S_{1,k} + S_{3,k}) - Va_0 \qquad (4)$$

In the formula (4), "N2" represents the number of horizontal scanning periods in the period T20, and "$S_{1,k}$" and "$S_{3,k}$" represent the data $S_1$ and $S_3$ at the time of normal readout of the vertical signal lines VL1 and VL3 in the k-th horizontal scanning period of the normal readout region, respectively. By subtracting the first correction component $Va_0$ calculated by the formula (3) from the sum of the data $S_1$ and $S_3$, it is possible to reduce level difference (DC difference) between the data $R_1$ and $R_3$ at the time of the cyclic readout and the data $S_1$ and $S_3$ at the time of normal readout. This ensures continuity of smoothing processing, which will be described later, and makes it possible to suppress an abrupt change in value. The level difference between the data $R_1$ and $R_3$ and the data $S_1$ and $S_3$ is mainly due to the difference in the accumulation time.

FIG. 7D is a block diagram of the first processing unit 1503 and the second processing unit 1504 according to the present embodiment, and illustrates the operation state in the normal readout period T21 (after time t312) of FIG. 4C. In the period T21, the normal readout is performed after the N2-th horizontal scanning period. The subtraction unit 1530 sequentially updates the first correction components $Va_1$ and $Va_3$ based on the difference values between the data $S_1$ and $S_3$ output from the averaging unit 1502 and the second correction component Vb. The calculated difference values are classified according to the vertical signal line identifier and input to the filter unit 1531 or the filter unit 1532. The filter units 1531 and 1532 perform smoothing processing (low-pass filter processing) using the input difference value and the current calculation result held in the filter units 1531 and 1532. The smoothing processing may be performed, for example, by the following a primary IIR (Infinite Impulse Response) processing.

$$Va_{1,N}=\{Va_{1,(N-1)}\times A1+(S_{1,N}-Vb_{(N-1)})\times(1-A1)\} \qquad (5)$$

$$Va_{3,N}=\{Va_{3,(N-1)}\times A1+(S_{3,N}-Vb_{(N-1)})\times(1-A1)\} \qquad (6)$$

In the formulas (5) and (6), "A1" denotes an attenuation coefficient of the primary IIR treatment, and is a value in the range of 0<A1<1. Further, "$Va_{1,N}$" and "$Va_{3,N}$" represent the first correction component Va updated in the N-th horizontal scanning period of each of the vertical signal lines VL1 and VL3, and "$Vb_{(N-1)}$" represents the second correction component Vb in the (N−1)-th horizontal scanning period. That is, the first correction component Va for each vertical signal line VL is updated using the second correction component Vb depending on the vertical position and the data S.

The subtraction unit 1530 is not necessarily required, and the input data "$S_1$, N" and "$S_3$, N" may be input to the filter units 1531 and 1532. However, when the image includes steep vertical shading, it is preferable to provide the subtraction unit 1530. The reason will be described in detail below. The calculation results of formulas (5) and (6) are updated only once every horizontal scanning period. Therefore, when the image includes a steep vertical shading, a relatively large attenuation coefficient A1 is required to smooth the vertical shading. That is, in order to adapt to the steep vertical shading, the cutoff frequency of the low-pass filter should be high. On the other hand, in order to avoid the influence of noise, a small value of the attenuation coefficient A1 is preferable at the time of high sensitivity imaging or the like. Thus, the attenuation coefficient A1 may be defined by a tradeoff between contradicting factors. When the subtraction unit 1530 is provided, since the second correction component Vb is subtracted from the data $S_1$ and $S_3$, the influence of the steep vertical shading can be reduced. Since the calculation result of the filter unit 1541 is updated twice in one horizontal scanning period, it is possible to easily adapt to the steep vertical shading as compared with the calculation results of the filter units 1531 and 1532. Thus, the subtraction unit 1530 is particularly effective when the vertical shading is large.

The subtraction unit 1540 calculates a difference between the input data $S_1$ and $S_3$ and the first correction components $Va_1$ and $Va_3$. Since the first correction components $Va_1$ and $Va_3$ include a difference between the vertical lines, the difference between the vertical lines is reduced or not included in the difference value obtained by subtracting the first correction components $Va_1$ and $Va_3$. The difference value obtained by the subtraction unit 1540 is input to the filter unit 1541. The data $S_1$ of the vertical signal line VL and the data $S_3$ of the vertical signal line VL3 are alternately input to the filter unit 1541 every half (½) horizontal scanning period. The filter unit 1541 performs smoothing processing using the input difference and the calculation result held in the filter unit 1541. The smoothing processing can be performed, for example, by the following primary IIR processing.

$$Vb_N = \{Vb_{(N-1)/2} \times A2 + (S_{1,N} - Va_{1,N}) \times (1-A2)\} \quad (7)$$

In the formula (7), "i" denotes the identification number of the vertical signal line. "A2" denotes an attenuation coefficient of the primary IIR processing, and is a value in a range of 0<A2<1. "$Vb_N$" represents the second correction component in the N-th horizontal scanning period. The second correction component $Vb_N$ may vary depending on the vertical position, but is a value common to the vertical signal lines VL1 and VL3. In the formula (7), the first correction component $Va_1$, which is the calculation result of the filter unit 1531, is referred to for processing the data $S_1$ of the vertical signal line VL1, and the first correction component $Va_3$, which is the calculation result of the filter unit 1532, is referred to for processing the data $S_3$ of the vertical signal line VL3. The second correction component Vb is common to the vertical signal lines VL1 and VL3 without depending on the vertical signal line VL. Therefore, the second correction component Vb obtained from the data $S_1$ of the vertical signal line VL1 can be referred to with respect to the second correction component Vb of the vertical signal line VL3, and the second correction component Vb obtained from the data $S_3$ of the vertical signal line VL3 can be referred to with respect to the second correction component Vb of the vertical signal line VL1. In the formula 7, "$Vb_{(N-1)/2}$" indicates that the next second correction component Vb is obtained from the second correction component Vb before the half (½) horizontal scanning period. Even if a shading exists in the vertical direction, the filter unit 1532 can output the second correction component Vb whose noise is reduced while adapting to the vertical shading.

The addition unit 1542 adds the updated first correction component Va and the second correction component Vb. and outputs the added value as an OB value (offset value). By subtracting the OB value from the pixel data in the opening region 11a, the subtraction unit 1505 of the OB clamp calculation unit 150 can realize the OB value correction to reduce the difference between the vertical lines and the shading in the vertical direction.

As described above, in the photoelectric conversion device according to the present embodiment, the OB value is decomposed into the first correction component and the second correction component, and the first correction component is sequentially updated using the second correction component. First, the plurality of the first correction components Va including difference between the vertical lines is obtained from the data R at the time of the cyclic readout. The first correction component Va of each of the plurality of vertical signal lines VL is sequentially updated using the second correction component common to the plurality of first correction components Va and the data S at the time of the normal readout. Therefore, according to the present embodiment, it is possible to realize high-precision OB correction without providing a large number of OB regions.

In particular, the photoelectric conversion device according to the present embodiment subtracts the first correction component Va from the data S at the time of the normal readout to obtain the second correction component Vb that is independent of the vertical signal line VL. Therefore, when calculating the second correction component Vb, it is not necessary to obtain the correction value separately for each vertical signal line VL, and it is possible to perform the high-precision OB correction with a small amount of data and a small OB region.

Further, the initial value of the first correction component Va can be calculated from the data R in a smaller area by the cyclic readout. The number of repetitions of the cyclic readout is determined according to the amount of noise so that difference between the vertical lines can be obtained from a small region with high accuracy.

Here, effects of the present embodiment will be described by comparing with other configurations. In general, the OB value includes components dependent on a horizontal position, components dependent on a vertical position, and components independent of a position. The OB clamp in this embodiment may be configured to correct the components dependent on the vertical position and the components independent of the position, and the components independent of the horizontal position may be corrected by another configuration. The components dependent on the vertical position and components independent of the position include components dependent on the vertical signal line VL and other components such as dark current. Here, it is assumed that among the components dependent on the vertical position, the components dependent on the vertical signal line are small.

As another method of OB correction, it would be possible to obtain the OB value by obtaining data for each row and smoothing data in the vertical direction independently for each vertical signal line. In this method, a larger OB region is required according to the number of vertical signal lines in order to reduce random noise. In addition, the sampling interval is increased, and it is difficult to adapt to the vertical shading.

On the other hand, in the present embodiment, as described above, the OB value is decomposed into the first correction component Va and the second correction component Vb, and the first correction component Va is sequentially updated using the second correction component Vb. Therefore, when calculating the second correction component Vb, it is not necessary to separately obtain the correction value for each vertical signal line VL, and it is not necessary to provide a large number of OB regions corresponding to the number of vertical signal lines VL. Since the first correction component Va is sequentially updated in the data S at the time of the normal readout, the first correction component Va can be adapted to the vertical shading. Therefore, according to the present embodiment, it is possible to obtain the OB value with high accuracy without requiring a large number of OB regions.

In the above description, although the number of vertical signal lines VL is four, the number of vertical signal lines VL may be any number greater than or equal to two. Further, although the first correction component Va is classified (calculated) for each vertical signal line VL, it may be classified for each group of other circuit elements. For example, when the floating diffusion is shared by a plurality of the pixels, there may be a difference in the OB values depending on the order of pixels for transferring charges to the floating diffusion. In this case, the first correction components Va may be classified according to the order of pixels for transferring charges to the floating diffusion FD. When the pixels are distance measuring pixels including a plurality of photoelectric conversion portions, the first correction components Va may be classified according to the driving method of the pixels. For example, the first correction component Va may be classified for each reading method of the image A, the image B, and the image (A+B). Further, when the image A is intermittently read out, the first correction components Va may be classified according to whether or not the image A is read out. Also, a plurality of categories may be combined. The larger the number of classifications, the higher the effect of calculating the OB value with high accuracy.

Further, although the filter units 1531, 1532, and 1541 have been described as a primary IIR, other IIRs such as a secondary IIR, FIR (Finite Impulse Response) or the like may also be used.

Further, in the cyclic readout, the N-N readout and the NULL readout may be combined. Alternatively, if the vertical scan is thinned out in the normal readout and all the rows are not read out, the non-readout rows may be used for calculating the OB values. When the pixel 110 used for calculating the OB values is included in the opening region 11a, the N-N readout is preferable. Thus, the OB values such as a difference between the vertical lines can be obtained using various readout methods.

The number of the cyclic readouts (the number of horizontal scanning periods N1) can be arbitrarily defined. As the number of cycles increases, the noise included in the initial value of the first correction component Va is reduced. On the other hand, from the viewpoint of power consumption and frame rate, the number of cycles may be preferably small. The number of cycles may be defined by a tradeoff in multiple factors. For example, the number of cycles may be dynamically changed depending on the mode of vertical scan, ISO (International Organization for Standardization) sensitivity, temperature, etc.

Although the vertical signal line identifier is used to classify the first correction components Va, the vertical signal line identifier is switched every half (½) horizontal scanning period. Therefore, the vertical signal line identifier is not necessarily required, and the vertical signal line may be discriminated from the timing of the horizontal scanning.

Second Embodiment

Next, a photoelectric conversion system according to the present embodiment will be described. Although the OB clamp calculation is performed in the photoelectric conversion device in the first embodiment, the OB clamp calculation may be performed outside the photoelectric conversion device in the present embodiment.

Figure 8:
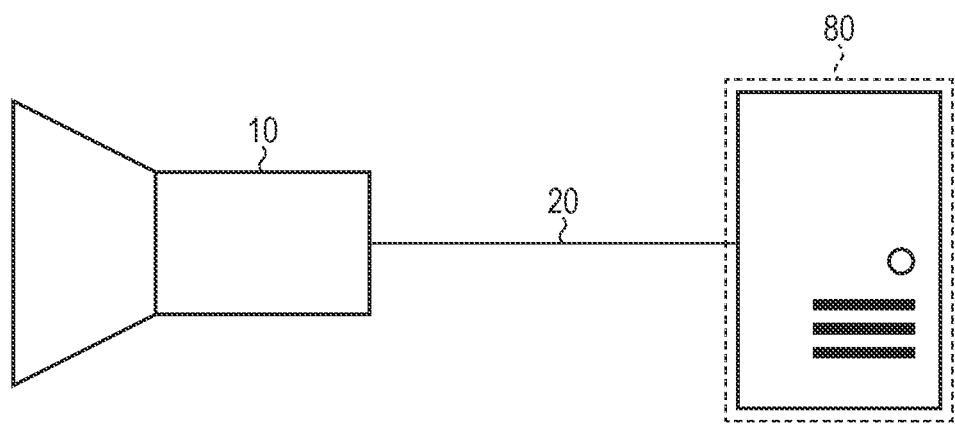
FIG. 8 is a diagram illustrating a configuration example of a photoelectric conversion system according to a second embodiment.

FIG. 8 illustrates a configuration example of a photoelectric conversion system according to the present embodiment. The photoelectric conversion system includes a photoelectric conversion device 10 and a calculation device 80. The calculation device 80 can execute a predetermined correction calculation by receiving data from the photoelectric conversion device 10 via the communication line 20 and executing a computer program. The communication line 20 may be wired or wireless, and may be public wireless communication or short-range wireless communication. The calculation device 80 can perform the functions of the OB clamp calculation unit 150 in the first embodiment, and receives data input to the OB clamp calculation unit 150. The calculation device 80 can store data of one frame including the cyclic readout data and the normal readout data in a memory in the calculation device 80, and can repeatedly refer to the data stored in the memory in the calculation processing. The calculation device 80 may be a standalone personal computer, an edge terminal, a server on a cloud, or the like.

Figure 9:
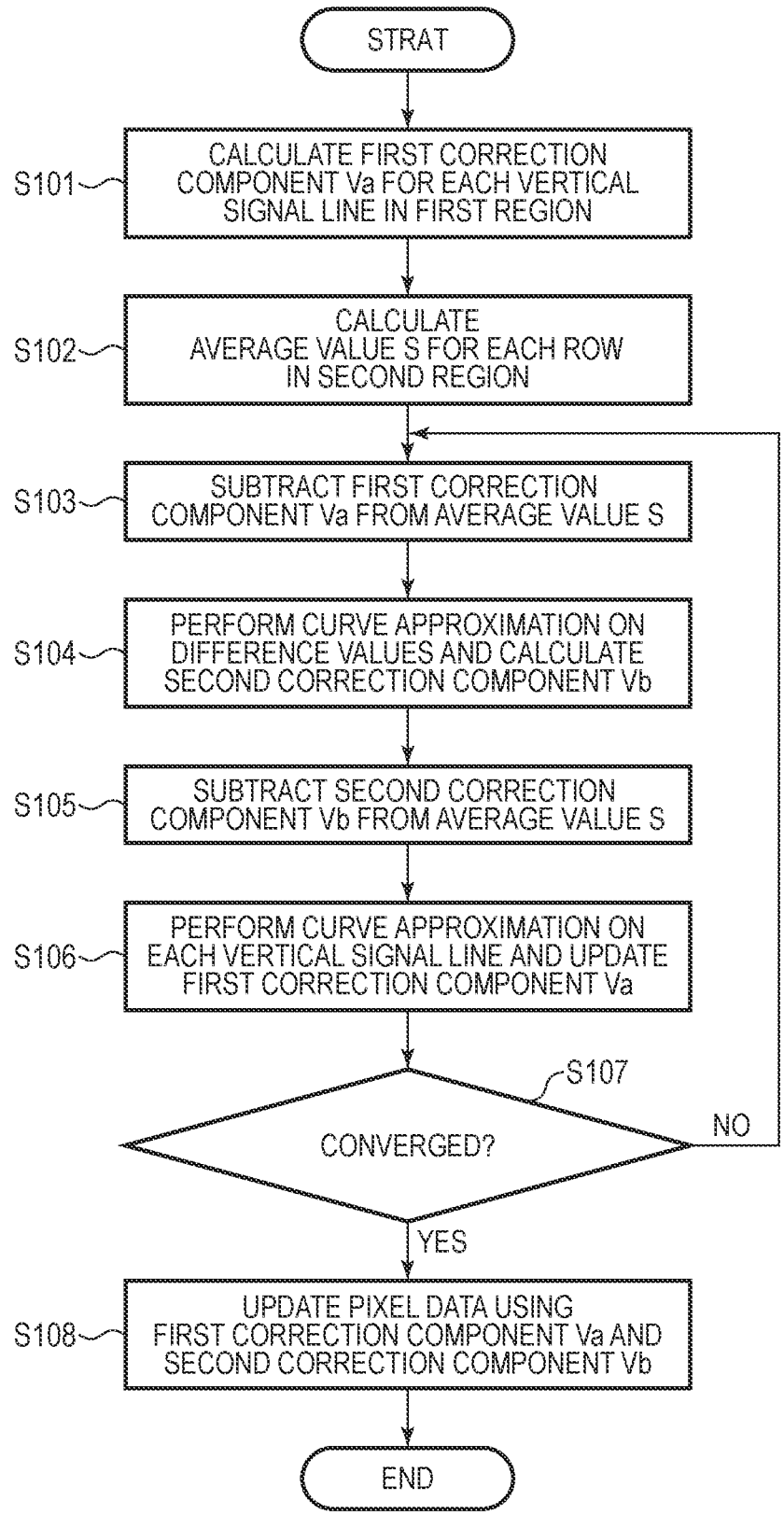
FIG. 9 is a flowchart of a correction operation according to the second embodiment.

FIG. 9 is a flowchart illustrating the operation of the calculation device 80 according to the present embodiment. In step S101, the calculation device 80 calculates the first correction component Va for each vertical signal line in the first region of the data of one frame stored in the memory. Here, the first region may be a data region corresponding to the OB region 11b or the like. The calculation device 80 classifies the data R at the time of cyclic readout for each vertical signal line VL, and calculates an average value of the classified data R. The average value is calculated in the same manner as in the formulas (1) and (2) of the first embodiment. The calculated average value here is used as an initial value of the first correction component Va.

In step S102, the calculation device 80 calculates the average value S for each row in the second region, which is the correction value calculation region of the data of one frame. Since the processes of steps S101 and S102 are independent, the process of step S102 may be executed prior to the process of step S101.

In step S103, the calculation device 80 calculates a difference value obtained by subtracting the first correction component Va of the vertical signal line VL from the average value S calculated in the step S102.

Figure 10:
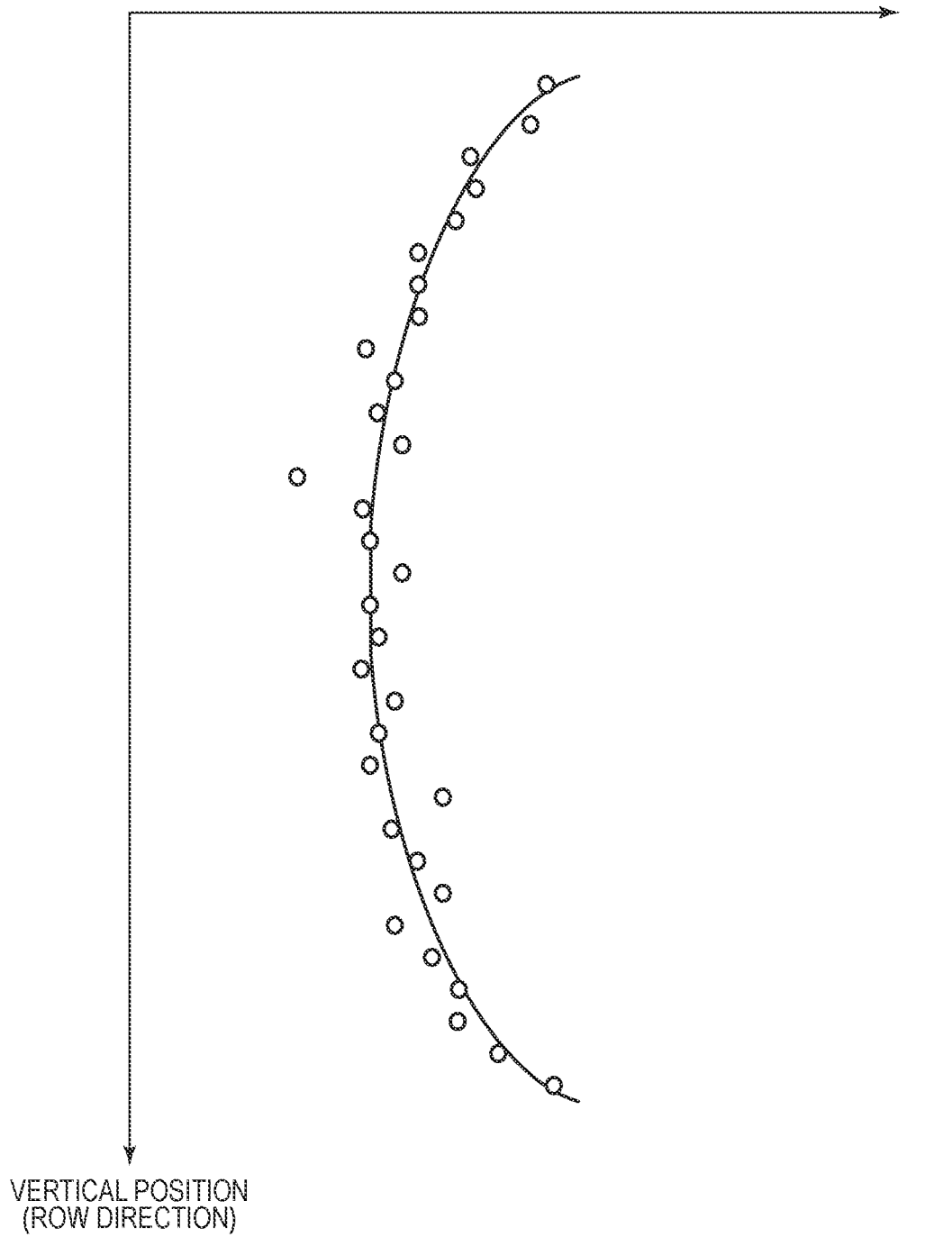
FIG. 10 is a diagram illustrating an example of curve approximation according to the second embodiment.

In step S104, the calculation device 80 performs a curve approximation on the difference values calculated in the step S103 in the vertical direction. FIG. 10 is a diagram illustrating an example of the curve approximation according to the present embodiment. In FIG. 10, the horizontal axis represents the difference values, and the vertical axis represents the vertical position (row direction, i.e., the Y coordinate of the image). Each point corresponds to a difference for each row, and a solid line represents a curve obtained by function-approximating the difference. Thus, the correction value corresponding to the shading component in the vertical direction can be obtained by the curve approximation. The curve may be approximated by a polynomial for the Y coordinate, or may be approximated by an arbitrary function such as a spline curve. The curve obtained in this manner represents the second correction component Vb having difference values depending on the vertical position N.

In step S105, the calculation device 80 calculates a difference value obtained by subtracting the second correction component Vb in the step S104 from the average value S of each row calculated in the step S102.

In step S106, the calculation device 80 performs the curve approximation on the difference values in the step S105 in the same manner as in the step S104. The curve is obtained for each vertical signal line VL. The calculation device 80 updates the obtained curve as the first correction component Va.

In step S107, the calculation device 80 determines whether or not the updated result has converged. That is, in the updating processing of the steps S104 and S106, the calculation device 80 calculates the difference values respectively between the first correction component Va and the second correction component Vb which are before updated and the first correction component Va and the second correction component Vb which are updated, and the calculation device 80 determines whether or not the difference values are equal to or smaller than a predetermined value. When the updated result is not converged, that is, when the difference values exceed the predetermined value (NO in step S107), the calculation device 80 repeats the processing of the steps S103 to S107. When the updated result is converged, that is, when the difference values are equal to or less than the predetermined value (YES in step S107), the calculation device 80 performs the processing of step S108. The calculation device 80 repeats the processing of the steps S103 to S107 until the difference values converge, and continues updating of the first correction component Va and the second correction component Vb. Thus, errors of the first correction component Va and the second correction component Vb are reduced.

In step S108, the calculation device 80 calculates an OB value obtained by adding the second correction component Vb in the step S104 and the first correction component Va in the step S106. The calculation device 80 can perform high-precision OB correction by subtracting the OB value from the pixel data in the opening region 11a.

Thus, the correction calculation in the calculation device 80 is performed. In the present embodiment, since data is repeatedly referred to, a relatively large memory is required, but precise correction can be obtained.

In the present embodiment, the curve approximation in the vertical direction is obtained in order to adapt to the shading in the vertical direction. Moreover, in order to adapt to the shading including the shading in the horizontal direction, the curved surface approximation may be performed in the three-dimensional space of the vertical direction, the horizontal direction, and the pixel value.

Third Embodiment

Figure 11:
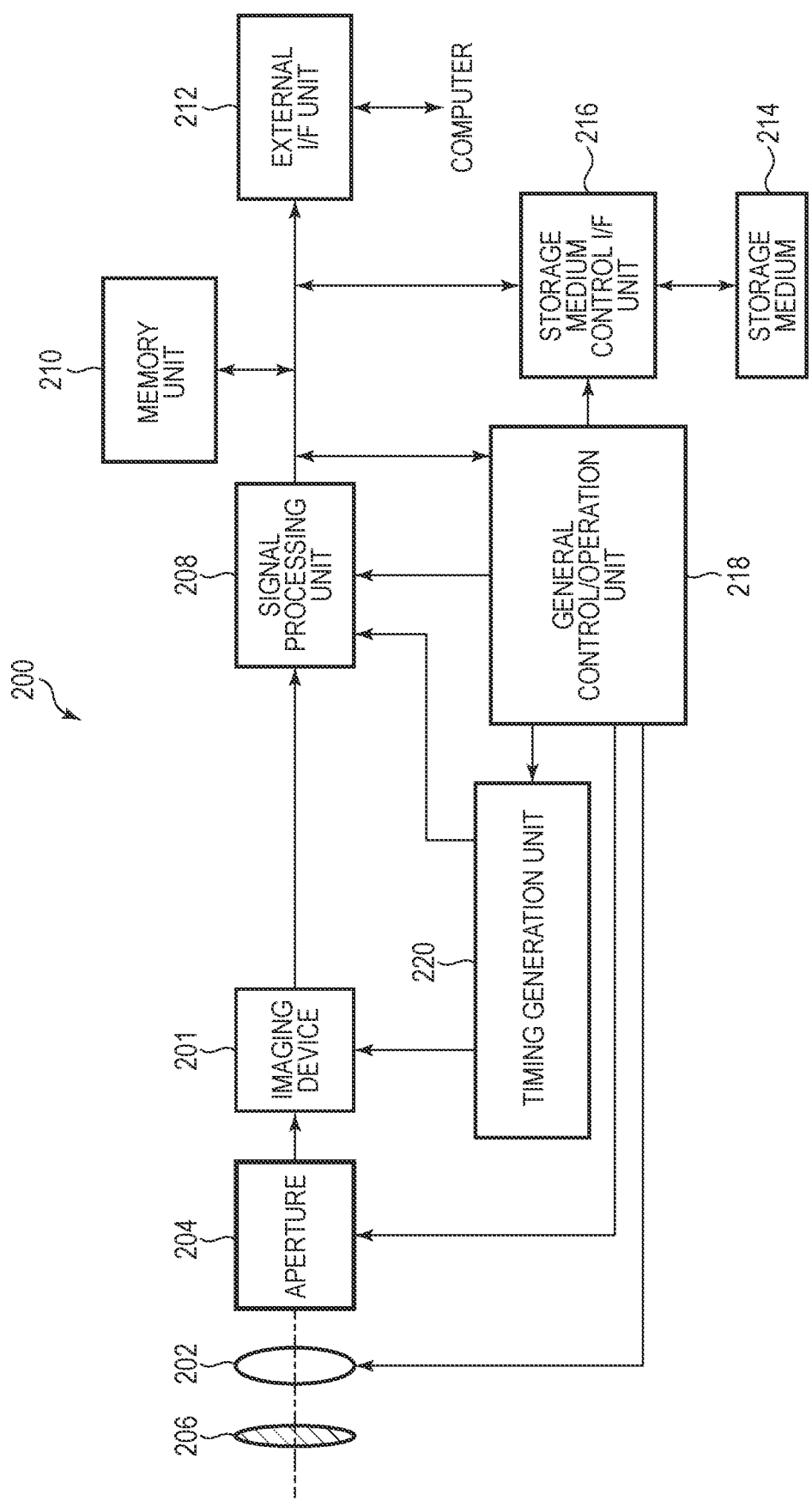
FIG. 11 is a block diagram illustrating a schematic configuration of an imaging system according to a third embodiment.

An imaging system according to the present embodiment will be described. FIG. 11 is a block diagram illustrating a schematic configuration of an imaging system according to the present embodiment. The imaging system 200 illustrated in FIG. 11 includes an imaging device 201, a lens 202 for forming an optical image of a subject on the imaging device 201, an aperture 204 for varying the amount of light passing through the lens 202, and a barrier 206 for protecting the lens 202. The lens 202 and the aperture 204 are optical systems that collect light on the imaging device 201. The imaging device 201 is the photoelectric conversion device 10 described in the first or the second embodiment, and converts an optical image formed by the lens 202 into image data.

The imaging system 200 also includes a signal processing unit 208 that processes an output signal output from the imaging device 201. The signal processing unit 208 generates image data from a digital signal output from the imaging device 201. The signal processing unit 208 performs various corrections and compressions as needed to output image data. The imaging device 201 may include an AD converter that generates a digital signal to be processed by the signal processing unit 208. The AD conversion unit may be formed in a semiconductor layer (semiconductor substrate) in which the photoelectric conversion portion of the imaging device 201 is formed, or may be formed in a semiconductor substrate different from the semiconductor layer in which the photoelectric conversion portion of the imaging device 201 is formed. The signal processing unit 208 may be formed on the same semiconductor substrate as the imaging device 201.

The imaging system 200 further includes a memory unit 210 for temporarily storing the image data, and an external interface unit (external I/F unit) 212 for communicating with an external computer or the like. Further, the imaging system 200 includes a storage medium 214 such as a semiconductor memory for storing or reading the imaging data, and a storage medium control interface unit (storage medium control I/F unit) 216 for storing or reading the imaging data on or from the storage medium 214. The storage medium 214 may be built in the imaging system 200, or may be detachable.

Further, the imaging system 200 includes a general control/operation unit 218 that controls various calculations and the overall digital still camera, and a timing generation unit 220 that outputs various timing signals to the imaging device 201 and the signal processing unit 208. Here, the timing signal or the like may be input from the outside, and the imaging system 200 may include at least the imaging device 201 and a signal processing unit 208 that processes an output signal output from the imaging device 201.

The imaging device 201 outputs the imaging signal to the signal processing unit 208. The signal processing unit 208 performs predetermined signal processing on the imaging signal output from the imaging device 201, and outputs image data. The signal processing unit 208 generates an image using the imaging signal.

As described above, according to the present embodiment, it is possible to realize an imaging system to which the photoelectric conversion device 10 according to the first or the second embodiment is applied.

Fourth Embodiment

Figure 12A:
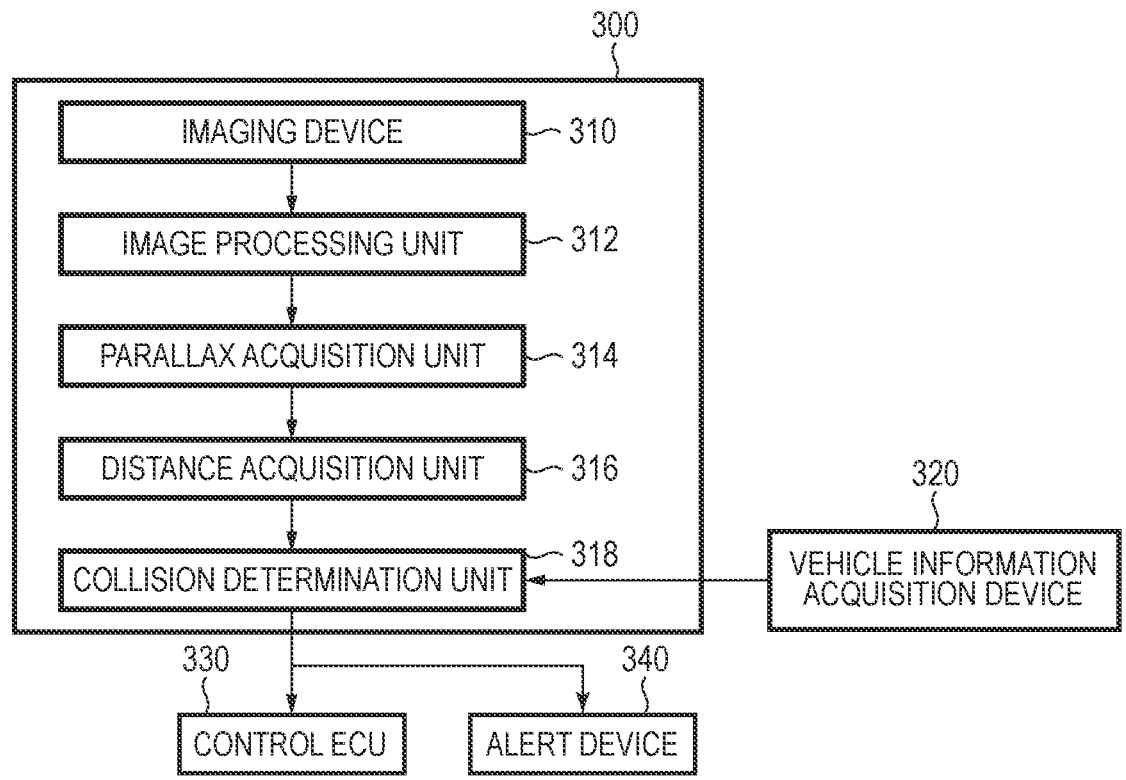
FIGS. 12A and 12B are diagrams illustrating a configuration example of an imaging system and a mobile body according to a fourth embodiment.
Figure 12B:
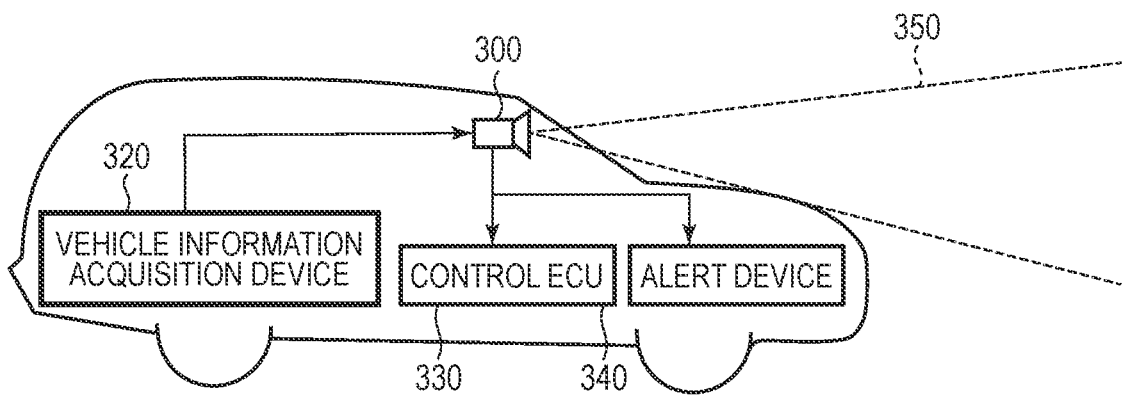

An imaging system and a mobile body according to the present embodiment will be described. FIGS. 12A and 12B are diagrams illustrating a configuration of an imaging system and a mobile body according to the present embodiment.

FIG. 12A illustrates an example of an imaging system relating to a vehicle-mounted camera. The imaging system 300 includes an imaging device 310. The imaging device 310 is the photoelectric conversion device 10 described in the first or the second embodiment. The imaging system 300 includes an image processing unit 312 that performs image processing on a plurality of image data acquired by the imaging device 310, and a parallax acquisition unit 314 that calculates parallax (phase difference of parallax images) from the plurality of image data acquired by the imaging system 300. The imaging system 300 includes a distance acquisition unit 316 that calculates a distance to an object based on the calculated parallax, and a collision determination unit 318 that determines whether or not there is a possibility of collision based on the calculated distance. Here, the parallax acquisition unit 314 and the distance acquisition unit 316 are examples of a distance information acquisition means that acquires distance information to the object. That is, the distance information is information on a parallax, a defocus amount, a distance to an object, and the like. The collision determination unit 318 may determine the collision possibility using any of the distance information. The distance information obtaining means may be configured by dedicated hardware or software modules. Further, it may be configured by FPGA (Field Programmable Gate Array). ASIC (Application Specific Integrated circuit), or the like, or may be configured by a combination of these.

The imaging system 300 is connected to the vehicle information acquisition device 320, and can obtain vehicle information such as a vehicle speed, a yaw rate, and a steering angle. Further, the imaging system 300 is connected to a control ECU 330, which is a control unit that outputs a control signal for generating a braking force to the vehicle, based on the determination result of the collision determination unit 318. The imaging system 300 is also connected to an alert device 340 that issues an alert to the driver based on the determination result of the collision determination unit 318. For example, when the collision possibility is high as the determination result of the collision determination unit 318, the control ECU 330 performs vehicle control to avoid collision and reduce damage by braking, returning an accelerator, suppressing engine output, or the like. The alert device 340 alerts a user by sounding an alert such as a sound, displaying alert information on a screen of a car navigation system or the like, or giving vibration to a seat belt or a steering wheel.

In the present embodiment, the imaging system 300 images the periphery of the vehicle, for example, the front or the rear. FIG. 12B illustrates an imaging system in the case of imaging an image in front of the vehicle (an imaging range 350). The vehicle information acquisition device 320 sends an instruction to the imaging system 300 or the imaging device 310. With such a configuration, the accuracy of distance measurement can be further improved.

In the above description, an example has been described in which control is performed so as not to collide with other vehicles, but the present invention is also applicable to control of automatic driving following other vehicles, control of automatic driving so as not to go out of a lane, and the like. Further, the imaging system is not limited to a vehicle such as a host vehicle, and can be applied to, for example, a mobile body (moving device) such as a ship, an aircraft, or an industrial robot. In addition, the present invention can be applied not only to a mobile body but also to a various equipment such as an intelligent transport systems (ITS).

Fifth Embodiment

Figure 13:
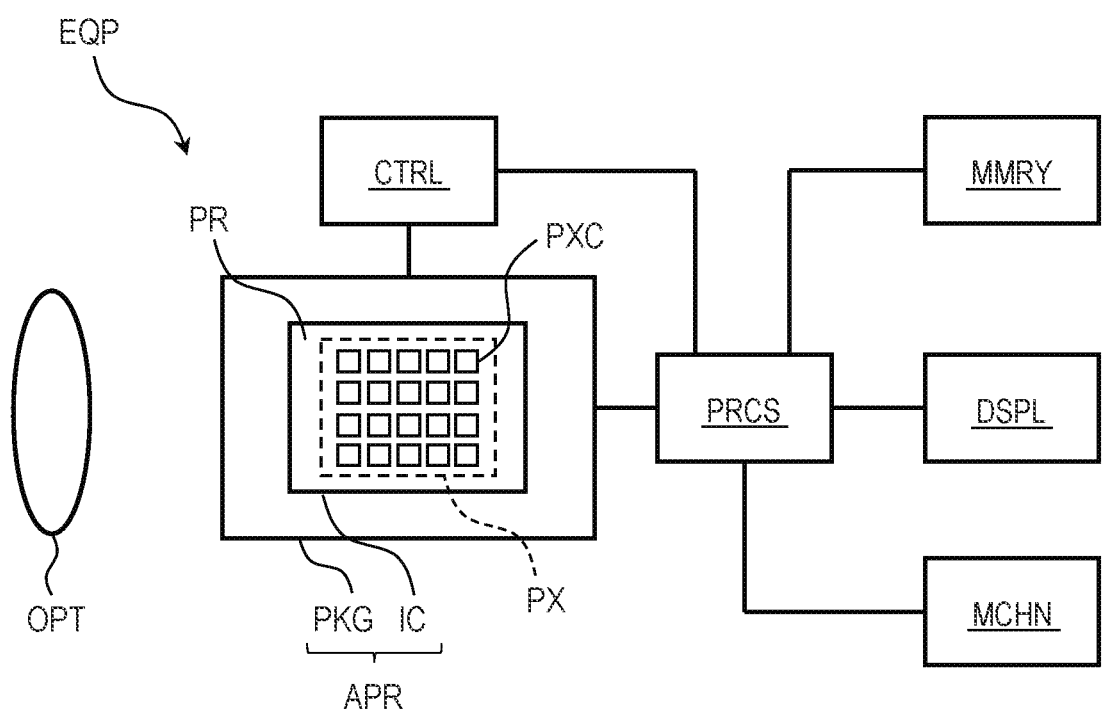
FIG. 13 is a block diagram illustrating a schematic configuration of equipment according to a fifth embodiment.

Equipment according to the present embodiment will be described. FIG. 13 is a block diagram showing a schematic configuration of equipment according to the present embodiment.

FIG. 13 is a schematic diagram illustrating equipment EQP including the photoelectric conversion device APR. The photoelectric conversion device APR has the function of the photoelectric conversion device 10 of the first embodiment. All or a part of the photoelectric conversion device APR is a semiconductor device IC. The photoelectric conversion device APR of this example can be used, for example, as an image sensor, an AF (Auto Focus) sensor, a photometry sensor, or a distance measurement sensor. The semiconductor device IC has a pixel region PX in which pixel circuits PXC including photoelectric conversion portion are arranged in a matrix. The semiconductor device IC can have a peripheral region PR around the pixel region PX. Circuits other than the pixel circuits can be arranged in the peripheral region PR.

The photoelectric conversion device APR may have a structure (chip stacked structure) in which a first semiconductor chip provided with a plurality of photoelectric conversion portions and a second semiconductor chip provided with peripheral circuits are stacked. Each peripheral circuit in the second semiconductor chip can be a column circuit corresponding to a pixel column of the first semiconductor chip. The peripheral circuits in the second semiconductor chip may be matrix circuits corresponding to the pixels or pixel blocks of the first semiconductor chip. As a connection between the first semiconductor chip and the second semiconductor chip, a through electrode (TSV), an interchip wiring by direct bonding of a conductor such as copper, a connection by micro bumps between chips, a connection by wire bonding, or the like can be adopted.

In addition to the semiconductor device IC, the photoelectric conversion device APR may include a package PKG that accommodates the semiconductor device IC. The package PKG may include a base body to which the semiconductor device IC is fixed, a lid body made of glass or the like facing the semiconductor device IC, and a connection member such as a bonding wire or a bump that connects a terminal provided on the base body to a terminal provided on the semiconductor device IC.

The equipment EQP may further comprise at least one of an optical device OPT, a control device CTRL, a processing device PRCS, a display device DSPL, a storage device MMRY, and a machinery device MCHN. The optical device OPT corresponds to the photoelectric conversion device APR as a photoelectric conversion device, and is, for example, a lens, a shutter, or a mirror. The control device CTRL controls the photoelectric conversion device APR, and is, for example, a semiconductor device such as an ASIC. The processing device PRCS processes a signal output from the photoelectric conversion device APR, and constitutes an AFE (analog front end) or a DFE (digital front end). The processing unit PRCS is a semiconductor device such as a central processing unit (CPU) or an application specific integrated circuit (ASIC). The display device DSPL is an EL display device or a liquid crystal display device which displays information (image) obtained by the photoelectric conversion device APR. The storage device MMRY is a magnetic device or a semiconductor device that stores information (images) obtained by the photoelectric conversion device APR. The storage device MMRY is a volatile memory such as an SRAM or a DRAM, or a nonvolatile memory such as a flash memory or a hard disk drive. The machinery device MCHN includes a mobile body or a propulsion unit such as a motor or an engine. In the equipment EQP, a signal output from the photoelectric conversion device APR is displayed on the display device DSPL, and is transmitted to the outside by a communication device (not shown) included in the equipment EQP. Therefore, it is preferable that the equipment EQP further includes the storage device MMRY and the processing device PRCS separately from a storage circuit unit and an arithmetic circuit unit included in the photoelectric conversion device APR The equipment EQP shown in FIG. 13 can be an electronic device such as an information terminal (for example, a smartphone or a wearable terminal) having a photographing function or a camera (For example, an interchangeable lens camera, a compact camera, a video camera, and a surveillance camera). The machinery device MCHN in the camera can drive components of the optical device OPT for zooming, focusing, and shutter operation. The equipment EQP may be a transportation device (mobile body) such as a vehicle, a ship, or a flight. The equipment EQP may be a medical device such as an endoscope or a CT scanner. The equipment EQP may be a medical device such as an endoscope or a CT scanner.

The machinery device MCHN in the transport device may be used as a mobile device. The equipment EQP as a transport device is suitable for transporting the photoelectric conversion device APR or for assisting and/or automating operation (manipulation) by an imaging function. The processing device PRCS for assisting and/or automating operation (manipulation) can perform processing for operating the machinery device MCHN as a mobile device based on information obtained by the photoelectric conversion device APR.

The photoelectric conversion device APR according to the present embodiment can provide a designer, a manufacturer, a seller, a purchaser, and/or a user with high value. Therefore, when the photoelectric conversion device APR is mounted on the equipment EQP, the value of the equipment EQP can be increased. Therefore, in order to increase the value of the equipment EQP, it is advantageous to determine the mounting of the photoelectric conversion device APR of the present embodiment on the equipment EQP when the equipment EQP is manufactured and sold.

Other Embodiments

The present invention is not limited to the above embodiments, and various modifications are possible. For example, an example in which some of the configurations of any of the embodiments are added to other embodiments and an example in which some of the configurations of other embodiments are substituted are also embodiments of the present invention.

It should be noted that any of the embodiments described above is merely an example of an embodiment for carrying out the present invention, and the technical scope of the present invention should not be construed as being limited by the embodiments. That is, the present invention can be implemented in various forms without departing from the technical idea or the main features thereof.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-198679, filed Dec. 7, 2021, which is hereby incorporated by reference herein in its entirety.

What is claimed is:

1. A photoelectric conversion device comprising:
a pixel unit including a plurality of pixels arranged in a matrix;
a driving unit that drives pixels in a first region by a first method and drives pixels in a second region by a second method;
a calculation unit that calculates a correction value based on pixel values read out from the first region and the second region; and
a correction unit that corrects an offset of a pixel value according to incident light based on the correction value,
wherein the calculation unit is configured to;
calculate an initial value of each of a plurality of first correction components based on a first pixel value read out from the first region,
update each of the plurality of first correction components, based on a second pixel value read out from the second region and a second correction component, and
calculate the correction value using an updated first correction component of the plurality of updated first correction component and the second correction component.

2. The photoelectric conversion device according to claim 1, wherein the second correction component is calculated from the second pixel value and one of the plurality of the first correction components.

3. The photoelectric conversion device according to claim 1, wherein the second correction component is calculated from a difference between the second pixel value and one of the plurality of the first correction components.

4. The photoelectric conversion device according to claim 1, wherein the plurality of the first correction components is representative values of a plurality of first pixel values.

5. The photoelectric conversion device according to claim 1, wherein the plurality of the first correction components is average values of a plurality of first pixel values.

6. The photoelectric conversion device according to claim 1, further comprising a plurality of signal lines provided corresponding to columns of the pixel unit,
wherein a first correction component of the plurality of first correction components is calculated for each of the plurality of signal lines, and
wherein the second correction component is common to the plurality of the signal lines and is a value corresponding to a row of the pixel unit.

7. The photoelectric conversion device according to claim 6,
wherein the plurality of pixels include a plurality of color pixels, and
wherein a first correction component of the plurality of first correction components is further calculated for each color of the plurality of color pixels.

8. The photoelectric conversion device according to claim 6,
wherein the pixel unit includes a pixels comprising first photoelectric conversion portion and a second photoelectric conversion portion, and
wherein a first correction component of the plurality of first correction components is further calculated for each method of reading out charges of the first photoelectric conversion portion and the second photoelectric conversion portion.

9. The photoelectric conversion device according to claim 1, wherein the first method and the second method are different in accumulation time.

10. The photoelectric conversion device according to claim 1, wherein the first method is cyclic readout for repeatedly reading a predetermined region.

11. The photoelectric conversion device according to claim 10, wherein the number of times of the cyclic readout is changed based on at least one of ISO (International Organization for Standardization) sensitivity, temperature, and a driving method by the driving unit.

12. The photoelectric conversion device according to claim 6, wherein, when a signal line of the plurality of signal lines is denoted by "i", the second pixel value is denoted by "S", a first correction component of the plurality of first correction component is denoted by "Va", and the second correction component is denoted by "Vb",
the first correction component ($Va_i$, N) of the i-th signal line in an N-th horizontal scanning period is calculated for each horizontal scanning period based on a difference ($S_{i, N} - Vb_{(N-1)}$) between the second pixel value and the second correction component.

13. The photoelectric conversion device according to claim 12,
wherein the first correction component ($Va_i$, N) is calculated according to the formula:

$$Va_{i,N} = \{Va_{i,(N-1)} \times A1 + (S_{i,N} - Vb_{(N-1)}) \times (1-A1)\}$$

where "A1" is a coefficient of an IIR (Infinite Impulse Response) processing, and satisfies 0<A1<1.

14. The photoelectric conversion device according to claim 12, wherein the second correction component ($Vb_N$) in the N-th horizontal scanning period is calculated based on a difference ($S_{i, N} - Va_{i, N}$) between the second pixel value and the first correction component.

15. The photoelectric conversion device according to claim 12,
wherein the second correction component ($Vb_N$) is calculated according to the formula:

$$Vb_N = \{Vb_{(N-1)} \times A2 + (S_{i,N} - Va_{i,N}) \times (1-A2)\}$$

where "A2" is a coefficient of an IIR (Infinite Impulse Response) processing and satisfies 0<A2<1.

16. The photoelectric conversion device according to claim 12,
wherein the second correction component ($Vb_N$) is calculated according to the formula:

$$Vb_N = \{Vb_{(N-1)/2} \times A2 + (S_{i,N} - Va_{i,N}) \times (1-A2)\}$$

where a plurality of rows is read out in one horizontal scanning period, and "A2" is a coefficient of an IIR (Infinite Impulse Response) processing and satisfies 0<A2<1.

17. The photoelectric conversion device according to claim 12,
wherein the initial value of a first correction component of the plurality of first correction component ($Va_i$) is calculated according to the formula:

$$Va_1 = \frac{1}{N_1} \sum_{k=1}^{N_1} R_{1,k}$$

where "$N_1$" represents the number of horizontal scanning periods in the first region, "R" represents the first pixel value, and "k" represents the k-th horizontal scanning period among the first to $N_1$-th horizontal scanning periods.

18. An image processing method comprising:
receiving pixel values read out from pixels in a first region of a pixel unit including a plurality of pixels in a matrix by driving a first method and pixel values read out from pixels in a second region of the pixel unit by driving a second method;
calculating a correction value based on the pixel values read out from the first region and the pixel values read out from the second region;
correcting an offset of a pixel value according to incident light based on the correction value;
calculating an initial value of each of a plurality of first correction components based on a first pixel value read out from the first region;
updating each of the plurality of the first correction components based on a second pixel value read out from the second region and a predetermined second correction component; and
calculating the correction value using an updated first correction component of the plurality of updated first correction components and the second correction component.

19. An imaging system comprising:
the photoelectric conversion device according to claim 1; and
a signal processing device that processes a signal output from the photoelectric conversion device.

20. A mobile body comprising:
the photoelectric conversion device according to claim 1;
a distance information acquiring unit that acquires distance information to an object, from a parallax image based on a signal from the photoelectric conversion device; and
a control unit that controls the mobile body based on the distance information.

21. Equipment including the photoelectric conversion device according to claim 1, further comprising at least one of:
an optical device corresponding to the photoelectric conversion device:
a control circuit that controls the photoelectric conversion device;
a processing device that processes a signal output from the photoelectric conversion device;
a machinery device that is controlled on the basis of information obtained by the photoelectric conversion device;
a display device that displays the information obtained by photoelectric conversion device; and
a storage device that stores the information obtained by the photoelectric conversion device.

* * * * *